United States Patent
Kori et al.

(10) Patent No.: US 6,687,802 B1
(45) Date of Patent: Feb. 3, 2004

(54) OUTPUTTING APPARATUS, OUTPUTTING METHOD, RECORDING APPARATUS, RECORDING METHOD, REPRODUCTION APPARATUS, REPRODUCTION METHOD AND RECORDING MEDIUM

(75) Inventors: Teruhiko Kori, Kanagawa (JP); Masaya Otsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,570

(22) Filed: Dec. 9, 1999

(30) Foreign Application Priority Data

Dec. 11, 1998 (JP) .......................... 10-352497
Dec. 28, 1998 (JP) .......................... 10-372676

(51) Int. Cl.⁷ .............................. G06F 13/00
(52) U.S. Cl. ................. 711/163; 711/156; 710/34; 360/60
(58) Field of Search ................. 711/163, 156, 711/154; 710/18, 34; 712/240; 705/52, 56

(56) References Cited

U.S. PATENT DOCUMENTS

| | | | |
|---|---|---|---|
| 5,761,699 A | 6/1998 | Hatanaka | 711/101 |
| 5,822,771 A | 10/1998 | Akiyama et al. | 711/162 |
| 6,034,832 A * | 3/2000 | Ichimura et al. | 360/60 |
| 6,597,469 B1 * | 7/2003 | Kuroyanagi | 358/1.15 |
| 2002/0014409 A1 * | 2/2002 | Nakamura et al. | 382/100 |

FOREIGN PATENT DOCUMENTS

| | | |
|---|---|---|
| EP | 0 668 695 | 8/1995 |
| EP | 0 778 566 | 6/1997 |
| EP | 0 800 312 | 10/1997 |
| EP | 0 813 194 | 12/1997 |
| EP | 1 016 948 | 7/2000 |

* cited by examiner

Primary Examiner—Reba I. Elmore
(74) Attorney, Agent, or Firm—Frommer Lawrence & Haug LLP; William S. Frommer; Gordon Kessler

(57) ABSTRACT

Recording control with additional information superposed on data and recording control in response to a type of a recording medium on which data are recorded are disclosed. A recording apparatus for recording data onto a recording medium includes an identification data detection section for detecting identification data for identification of data from the data, a copying count data detection section for detecting copying count data for limiting the number of times of copying the data from the data, and a recording control section for controlling recording of the data onto the recording medium based on the identification data detected by the identification data detection section and the copying count data detected by the copying count data detection section. Another recording apparatus for recording data onto a recording medium includes a discrimination section for discriminating a type of the recording medium, and a control section for selecting a recording control method for recording the data onto the recording medium in response to the discrimination section and controlling recording of the data onto the recording medium in accordance with the selected recording control method.

24 Claims, 12 Drawing Sheets

FIG. 4
| CONTENTS ID | PERMITTED NUMBER OF TIMES OF COPYING |
|---|---|
| ⋮ | ⋮ |
52
FIG. 5A
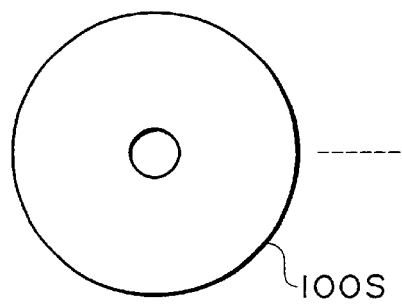
100S
- CONTENTS ID
- COPY GENERATION MANAGEMENT INFORMATION
- COPYING COUNT MANAGEMENT INFORMATION
FIG. 5B
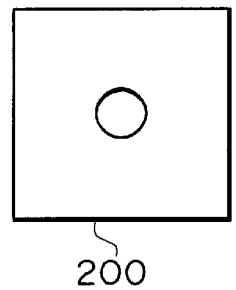
200
- CONTENTS ID
- COPY GENERATION MANAGEMENT INFORMATION
- COPYING COUNT MANAGEMENT INFORMATION
- APPARATUS ID
COPY →

FIG. 8

| | | Audio/Video Recording Medium | | General Purpose Data Recording Medium |
|---|---|---|---|---|
| | | Normal Rate Copying | High Rate Copying | |
| Audio/Video-Only Apparatus | | SCMS | UCS | Recording Impossible |
| General Purpose Apparatus (Computer) | Audio/Video Interface | UCS | UCS | Recording Impossible |
| | General Purpose Interface | Recording Impossible | Recording Impossible | No Guarantee of Copy Control |

OUTPUTTING APPARATUS, OUTPUTTING METHOD, RECORDING APPARATUS, RECORDING METHOD, REPRODUCTION APPARATUS, REPRODUCTION METHOD AND RECORDING MEDIUM

BACKGROUND OF THE INVENTION

This invention relates to an outputting apparatus, an outputting method, a recording apparatus, a recording method, a reproduction apparatus, a reproduction method and a recording medium by which various information signals such as, for example, an audio signal and/or a video signal or computer data can be recorded.

In recent years, as digital contents such as the Internet, compact discs (CD) and digital video discs (DVD) are spread, infringement on copyrights by illegal copying of digital contents has become into question. As a countermeasure to this problem, it has been proposed to add information for copying control to digital contents and use the information to prevent illegal copying.

Various controlling methods for preventing copying have been proposed and include a method which does not permit copying at all depending upon an information source and another method which permits copying only once but inhibits copying from a copy from an original, that is, a copy controlling system of generation limitation. The former is applied to original software which is produced and sold by a contents maker such as, for example, a DVD-ROM (Digital Video Disc-Read Only Memory). The latter copy controlling method of generation limitation is applied, for example, to information broadcast from broadcasting media.

The latter copy controlling method of generation limitation is demanded to allow the proprietor of the copyright to control the copy generation effectively. Several copying controlling methods which allow such management of the copy generation have been proposed and include a SCMS (Serial Copy Management System) for an audio signal, a CGMS (Copy Generation Management System) for a video signal and a method which makes use of an electronic watermark technique.

The SCMS system performs serial copying control using a copying inhibition/permission flag or using a category code representative of a type of a digital audio system such as, for example, a CD (compact disc) or a DAT (digital audio tape) to permit digital copying only once.

More particularly, according to the SCMS method, generation limitation control of copying of a digital audio signal can be performed based on SCMS information including a copy inhibition/permission flag and a category code transmitted together with the digital audio information such that copying of the digital audio signal in one generation is permitted, but the copied digital audio signal cannot be copied any more.

Meanwhile, according to the CGMS method, for example, where it is applied to an analog video signal, additional information of 2 bits for copying control is superposed in a particular one horizontal section in a vertical blanking period of the analog video signal, but where it is applied to a digital video signal, additional information of 2 bits for copying control is added to and transmitted together with digital video data.

The information of 2 bits used in the CGMS method (such information is hereinafter referred to as CGMS information) is defined such that it has the following significance:

"00" . . . copying is permitted

"10" . . . copying is permitted once (copying is permitted only for a generation)

"11" . . . copying is inhibited (absolute inhibition of copying)

When the CGMS information added to video information is "10", a recording apparatus for the CGMS determines that copying recording of the video information is permitted, and executes recording of the video information. Thereupon, however, the recording apparatus rewrites the CGMS information to "11" and adds the rewritten CGMS information to the recorded video information. On the other hand, if the CGMS information added to video information to be recorded is "11", then a recording apparatus for the CGMS determines that copying recording of the video signal is inhibited, and does not execute recording of the video information.

On the other hand, according to electronic watermark processing, information as noise is embedded in a portion which is present in video data or music data and is not significant on the perception of a human being, that is, a portion which is not redundant to music or an image. Additional information embedded in video data or music data by such electronic watermark processing cannot be removed readily from the video data or the music data. Meanwhile, even after filtering processing or data compression processing is performed for the video data or music data, the additional information of the embedded electronic watermark is detected from within the video data or music data.

In the copying controlling method which employs such an electronic watermark process as described above, the additional information to be embedded is defined so as to represent the four conditions that (1) "copying is permitted (Copy Free)", (2) "copying is permitted only once (copying is permitted for only one generation) (Copy Once)", (3) "copying is inhibited any more (No More Copy)", and (4) "copying is inhibited absolutely (Never Copy)", and represents a copy generation and a copying limitation condition of audio data or music data on which the electronic watermark information is superposed.

The (1) "copying is permitted (Copy Free)" represents that free copying of the music data or video data is permitted. The (2) "copying is permitted only once (copying is permitted by only one generation) (Copy Once)" represents that copying of the music data or video data is permitted only once. The (3) "copying is inhibited any more (No More Copy)" represents that the music data or video data are a copy of music data or video data in the condition of (2) that "copying is permitted only once" and are inhibited from being copied any more. The (4) "copying is inhibited absolutely (Never Copy)" represents that any copying is inhibited.

When the electronic watermark information superposed on video data or music data is "copying is permitted only once (Copy Once)", a recording apparatus which can effect electronic watermark processing, that is, which can effect copying limitation processing, determines that the video data or music data can be copied and thus executes recording. Upon such recording, however, the electronic watermark information which has been rewritten to "copying is inhibited any more (No More Copy)" is superposed on the recorded video data or music data. On the other hand, if the electronic watermark information superposed on video data or music data to be recorded is "copying is inhibited any more (No More Copy)", then a recording apparatus which can effect electronic watermark processing determines that copying recording of the video data or music data is inhibited, and does not execute recording.

In this manner, copying generation limitation control is performed by such copying generation limitation methods such as the SCMS method, the CGMS method and the method which employs an electronic watermark process such that an information signal of audio data and/or video data can be copied within such a range of personal use that it is copied and utilized in a home. However, since copying of the copied information signal is inhibited, the copied information signal is prevented from being copied successively so that the benefit or the right of the proprietor of the copyright of the information signal may not be infringed illegally.

Where copy generation limitation control of an information signal is performed using the SCMS method, the CGMS method or the method which employs an electronic watermark process, copying of a copied information signal onto a further recording medium is prevented. In other words, production of a copy of the second generation from a copy of the first generation is inhibited. However, there remains a problem that copying of the first generation is performed any number of times. More particularly, there is a problem that, for example, an original information signal provided from a contents maker and recorded on a CD or a DVD can be copied unlimitedly from the recording medium.

A possible countermeasure to the problem just described is to stop using such a copying generation limitation method as described above which involves the risk of production of a large number of copies from an information signal and provide an information signal in the form of a copy inhibiting disc copying of whose information signal is inhibited from the beginning.

However, where an information signal is provided in the form of a copy inhibiting disc, although the right of the proprietor of the copyright of the information signal can be protected with certainty, a user of the information signal cannot utilize the target information signal except from the copy inhibiting disc and thus submits to an excessively great limitation. Consequently, the countermeasure is not preferable.

For example, with regard to a copy inhibiting disc, such a manner of enjoyment of music as to select only favorite music data from a CD, copy the selected music data onto a magneto-optical disk of a small size called MD (Mini Disc; trade mark), a cassette tape, a semiconductor memory or the like and enjoy listening to them using a car stereo apparatus or enjoy listening to them on an electric car for commuters using a portable reproduction machine, as is performed within a range of personal copying, is subject to limitation.

Meanwhile, if the reproduction speed or the recording speed of an audio signal or a video signal is augmented, then copying of a target audio signal or video signal can be copied at a higher speed onto a recording medium. In this instance, since the target information can be copied in a shorter time, there is the possibility that a large number of recording media may be produced on which the same information signal is copied. Where such a large number of copied information signals are sold, the proprietor of the copyright of the information signal suffers a large amount of damage.

Particularly where a general purpose apparatus such as a computer which can effect various information processing is involved, it can copy an information signal readily and at a high speed from its characteristic. Further, since distribution and reception of an information signal through a network can be performed comparatively readily, there is a high degree of possibility that a large number of copies of the same information signal may be produced.

Thus, a copying limitation method is available wherein, when an information signal is to be copied, not such copying generation limitation control as described above is performed, but identification information of a copied information signal is stored for each recording apparatus and each recording apparatus does not copy an information signal of the same identification information as the information stored already in the recording apparatus. In other words, the copying limitation or controlling method permits only one time of copying for each information signal and for each recording apparatus.

However, where only the copying controlling method described above is employed, since copying of any information signal is permitted only once for each recording apparatus, any user of the information signal submits to new limitation in regard to copying of the information signal. For example, although, where the copy generation limitation method is employed, copying of an information signal recorded on an original recording medium such as a CD or a DVD can be performed any number of times, such copying is permitted only once by the copying limitation method. Therefore, copying of an information signal within a range of personal utilization is subject to limitation and the convenience to the user of the information signal is narrowed.

SUMMARY OF THE INVENTION

It is an object of the present invention to provide an outputting apparatus, an outputting method, a recording apparatus, a recording method, a reproduction apparatus, a reproduction method and a recording medium by which illegal copying of an information signal can be prevented effectively to protect the right of the proprietor of the copyright of the information signal appropriately without narrowing the convenience to the user of the information signal.

In order to attain the object described above, according to an aspect of the present invention, there is provided a recording apparatus for recording data onto a recording medium, including an identification data detection section for detecting identification data for identification of the data from the data, a copying count data detection section for detecting copying count data for limitation of a number of times of copying of the data from the data, and a recording controlling section for controlling recording of the data onto the recording medium based on the identification data detected by the identification data detection section and the copying count data detected by the copying count data detection section.

According to another aspect of the present invention, there is provided a recording apparatus for recording data onto a recording medium, including a discrimination section for discriminating a type of the recording medium, and a controlling section for selecting a recording controlling method to be used for recording of the data onto the recording medium in response to the discrimination section and controlling recording of the data onto the recording medium in accordance with the selected recording controlling method.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a diagrammatic view illustrating a copying history information management memory of the recording apparatus shown in FIG. 3;

FIG. 5A is a diagrammatic view illustrating additional information added to contents information recorded on a CD;

FIG. 5B is a diagrammatic view illustrating additional information added to contents information reproduced from the CD of FIG. 5A and copied onto an MD;

FIG. 8 is a diagrammatic view illustrating an information signal copying controlling method of a second preferred embodiment of the present invention;

DESCRIPTION OF THE PREFERRED EMBODIMENTS

First Embodiment

A first preferred embodiment of the present invention is described first. The following description of the first embodiment is given taking as an example a case wherein an audio signal of music data is recorded as contents information on and provided as a compact disc (hereinafter referred to simply as CD) to a user and the audio signal recorded on the CD is reproduced by and outputted from a CD player and then copied (reproduced) onto a mini disk (hereinafter referred to simply as MD) by means of a recording apparatus.

"Authoring Apparatus"

Figure 1:
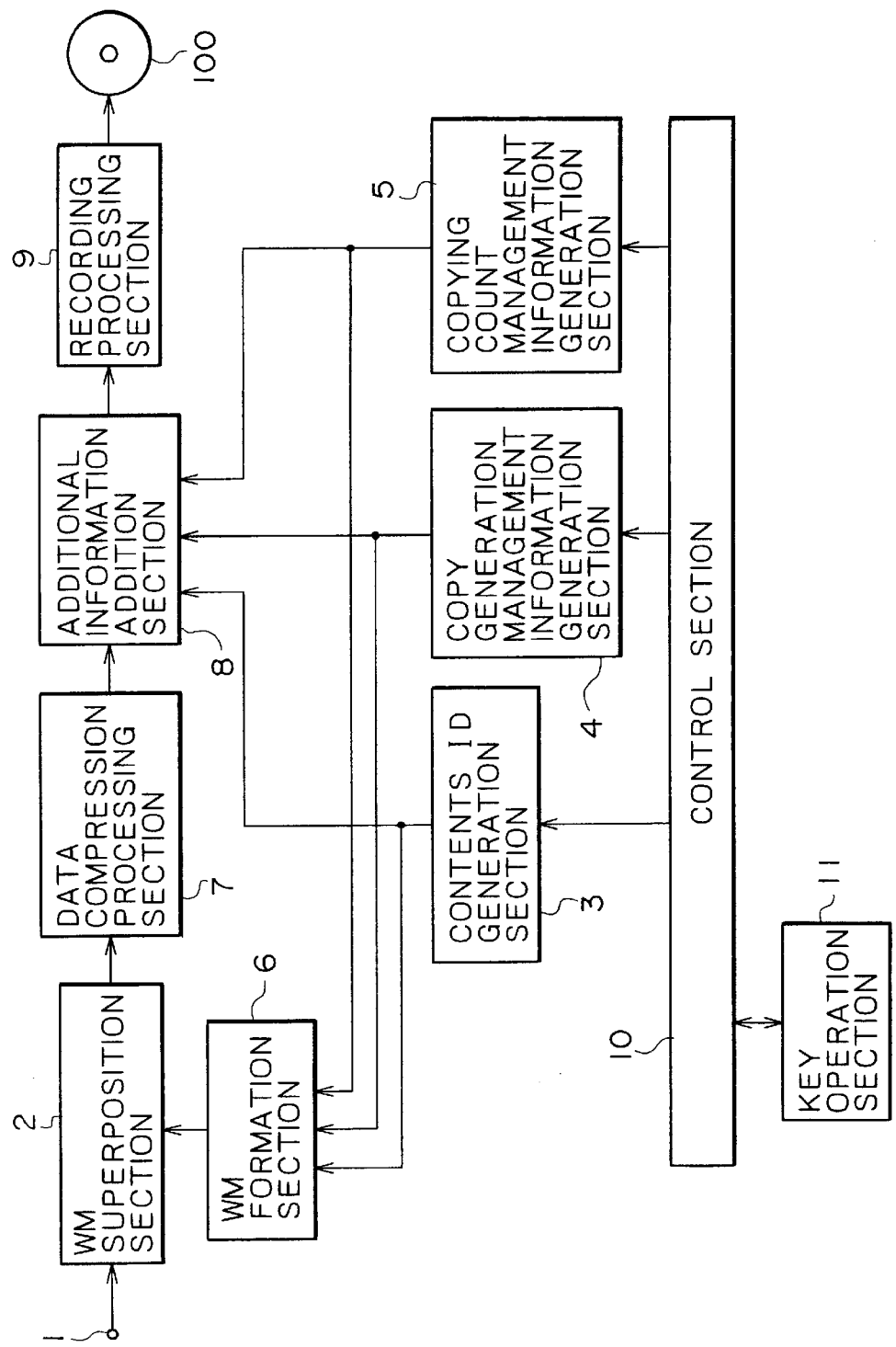
FIG. 1 is a block diagram of an authoring apparatus for a CD of a first preferred embodiment of the present invention.

FIG. 1 shows a recording apparatus for an audio signal for producing a master CD on which an audio signal such as, for example, music data is recorded as contents information. The recording apparatus is used by the contents maker side and is called authoring apparatus.

Referring to FIG. 1, the authoring apparatus shown includes an input terminal 1, an electronic watermark information superposition section (hereinafter referred to as WM superposition section) 2, an electronic watermark information formation section (hereinafter referred to as WM formation section) 6, a contents ID generation section 3, a copy generation management information generation section 4, a copying count management information generation section 5, a data compression processing section 7, an additional information addition section 8, a recording processing section 9, a control section 10, and a key operation section 11. Music data produced by the authoring apparatus is recorded onto a CD 100.

The authoring apparatus of the present embodiment adds three kinds of information including a contents ID, copy generation management information and copying count management information as additional information to music data as contents information. To this end, the contents ID generation section 3, copy generation management information generation section 4 and copying count management information generation section 5 shown in FIG. 1 are constructed so as to generate corresponding additional information.

The contents ID generation section 3 in the present invention generates a contents ID as identification information for identification of music data to be recorded as contents information on the CD 100. The contents ID in the present embodiment is an ISRC (International Standard Recording Code).

The copy generation management information generation section 4 generates information for managing the generation of a copy for each music data. In the present embodiment, the information is SCMS information including a copy permission/inhibition flag and so forth.

The copying count management information generation section 5 generates information for limiting the number of times of copying of each music data. In the present embodiment, the information is a permitted number of times of copying determined by, for example, the proprietor of the copyright.

A user of the authoring apparatus of the present embodiment inputs a contents ID, SCMS information and a permitted number of times of copying to be added to music data to be recorded onto the CD 100 through the key operation section 11 before recording of the music data onto the CD 100 is started. The control section 10 supplies, in response to the instruction input by the user, control signals indicative of information to be generated to the contents ID generation section 3, copy generation management information generation section 4 and copying count management information generation section 5.

Consequently, the contents ID generation section 3, copy generation management information generation section 4 and copying count management information generation section 5 form a contents ID, SCMS information and a permitted number of times of copying conforming to the instruction inputs from the user of the authoring apparatus of the present embodiment in accordance with the control signals from the control section 10, respectively, and supply the thus produced signals to the WM formation section 6 and additional information addition section 8.

The WM formation section 6 performs electronic watermark processing for the contents ID, SCMS information and permitted number of times of copying supplied thereto to form electronic watermark information representing them. The electronic watermark processing is processing to embed information as noise into a portion which is present in video data or music data and is not significant on the perception of a human being, that is, a portion which is not redundant to music or an image as described hereinabove.

The WM formation section 6 of the authoring apparatus performs spectrum spreading processing for the contents ID, SCMS information and permitted number of times of copying supplied thereto to form electronic watermark information representing the contents ID, SCMS information and permitted number of times of copying. The electronic watermark information is supplied to the WM superposition section 2.

Then, a digital audio signal such as, for example, music data to be recorded onto the CD 100 is supplied through the input terminal 1 to the WM superposition section 2. The WM superposition section 2 superposes the electronic watermark information corresponding to the contents ID, SCMS information and permitted number of times of copying formed by the WM formation section 6 in such a manner as described above onto the digital audio signal supplied thereto through the input terminal 1.

In this instance, while the electronic watermark information corresponding to the contents ID, SCMS information and permitted number of times of copying may be superposed on the same time region of the digital audio signal, the electronic watermark information corresponding to the contents ID, SCMS information and permitted number of times of copying is superposed in different time regions of the digital audio signal. The digital audio signal onto which the contents ID, SCMS information and permitted number of times of copying in the form of electronic watermark information have been superposed by the WM superposition section 2 is supplied to the data compression processing section 7.

The data compression processing section 7 compresses the digital audio signal supplied thereto in accordance with a predetermined method and supplies a resulting signal to the additional information addition section 8. The additional information addition section 8 adds the contents ID, SCMS information and permitted number of times of copying from the contents ID generation section 3, copy generation management information generation section 4 and copying count management information generation section 5 to the digital audio signal of the music data to be recorded onto the CD 100 as described above.

In this instance, the additional information is recorded into the TOC (Table Of Contents) or a directory of the CD 100 so as to correspond to the music data recorded or is added to an area different from that of the music data but in a corresponding relationship to the music data. In other words, additional information is added to each music data such that, upon reading out, additional information corresponding to target music data can be read out.

The digital audio signal to which the contents ID, SCMS information and permitted number of times of copying from the additional information addition section 8 are added is recorded onto the CD 100 by the recording processing section 9.

Consequently, the CD 100 on which the music data on which the contents ID, SCMS information and permitted number of times of copying are superposed individually as electronic watermark information and added as digital additional information is produced. Then, in the present embodiment, a large number of CDs on which the same information is recorded are produced from the CD 100 which is determined as a master CD, and provided to a large number of end users.

"Reproduction Apparatus"

Figure 2:
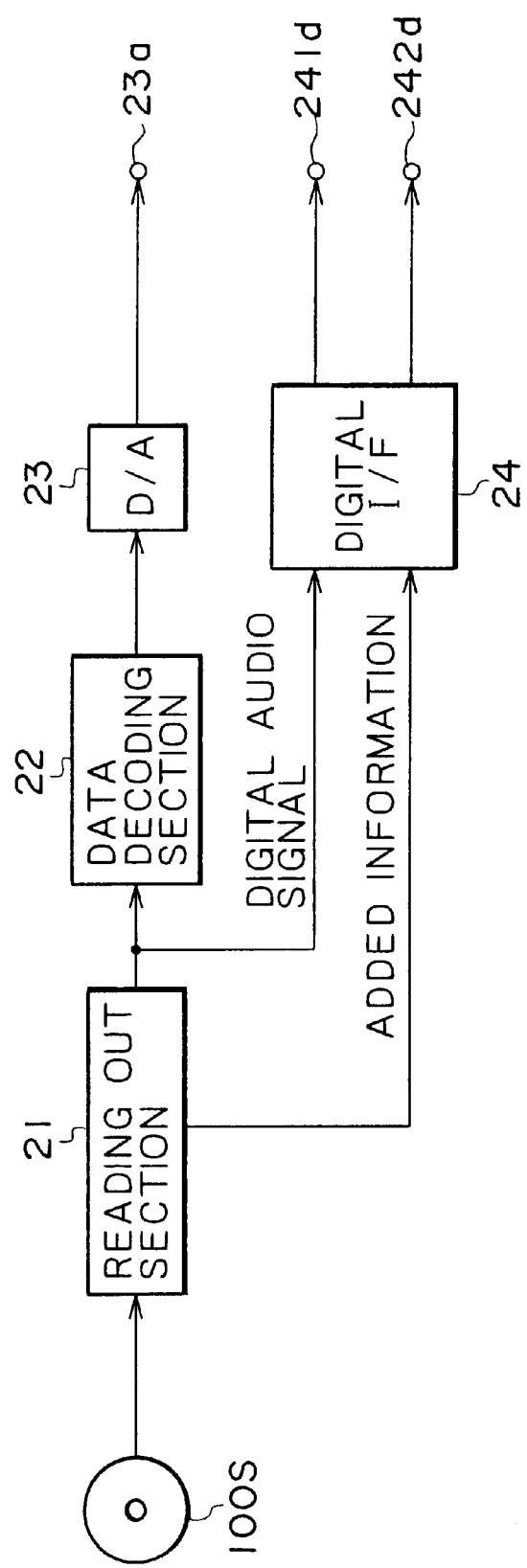
FIG. 2 is a block diagram of a reproduction apparatus of the first embodiment for reproducing a CD produced from a master CD produced by the authoring apparatus of FIG. 1.

FIG. 2 shows a reproduction apparatus for an audio signal in the present embodiment. The reproduction apparatus for an audio signal in the present embodiment is a CD player. The CD player in the present embodiment can reproduce a CD 100S produced based on the CD 100 produced by the authoring apparatus described above with reference to FIG. 1.

Referring to FIG. 2, the CD player in the present embodiment shown includes a reading out section 21, a data decoding section 22, a D/A converter 23, an output terminal 23a for an analog audio signal, a digital interface 24, an output terminal 241d for a digital audio signal, and an output terminal 242d for digital additional information.

The reading out section 21 reads out music data recorded as a digital audio signal on the CD 100S and additional information added to the music data. The music data thus read out is supplied to the data decoding section 22 and the digital interface 24. Meanwhile, the additional information read out from the CD 100S is supplied to the digital interface 24.

The data decoding section 22 performs decoding processing for the music data in the form of a digital audio signal compressed in accordance with a predetermined method and supplies the music data of the decompressed digital audio signal to the D/A converter 23. The D/A converter 23 converts the music data of the decompressed digital audio signal supplied thereto into music data of an analog audio signal, and outputs the music data in the form of the analog audio signal through the output terminal 23a.

In this instance, the contents ID, SCMS information and permitted number of times of copying of digital data added to a region different from that of the digital audio signal by the additional information addition section 8 of the authoring apparatus described above disappear as a result of conversion of the music data of the digital audio signal into the analog audio information.

However, the contents ID, SCMS information and permitted number of times of copying of the electronic watermark information superposed in the same time region as the time region of the digital audio signal do not disappear even if the digital audio signal is converted into an analog audio signal, but are outputted together with the analog audio signal so that they are supplied to a speaker, an earphone, a headphone, an audio signal recording apparatus or the like.

Meanwhile, the digital audio signal and the additional information in the form of a digital signal are supplied to the digital interface 24, and the digital audio signal is outputted through the output terminal 241d while the additional information is outputted through the output terminal 242d. The music data in the form of a digital audio signal and the additional information outputted in this manner are supplied, for example, to a recording apparatus for an audio signal having a digital interface.

"Recording Apparatus"

Figure 3:
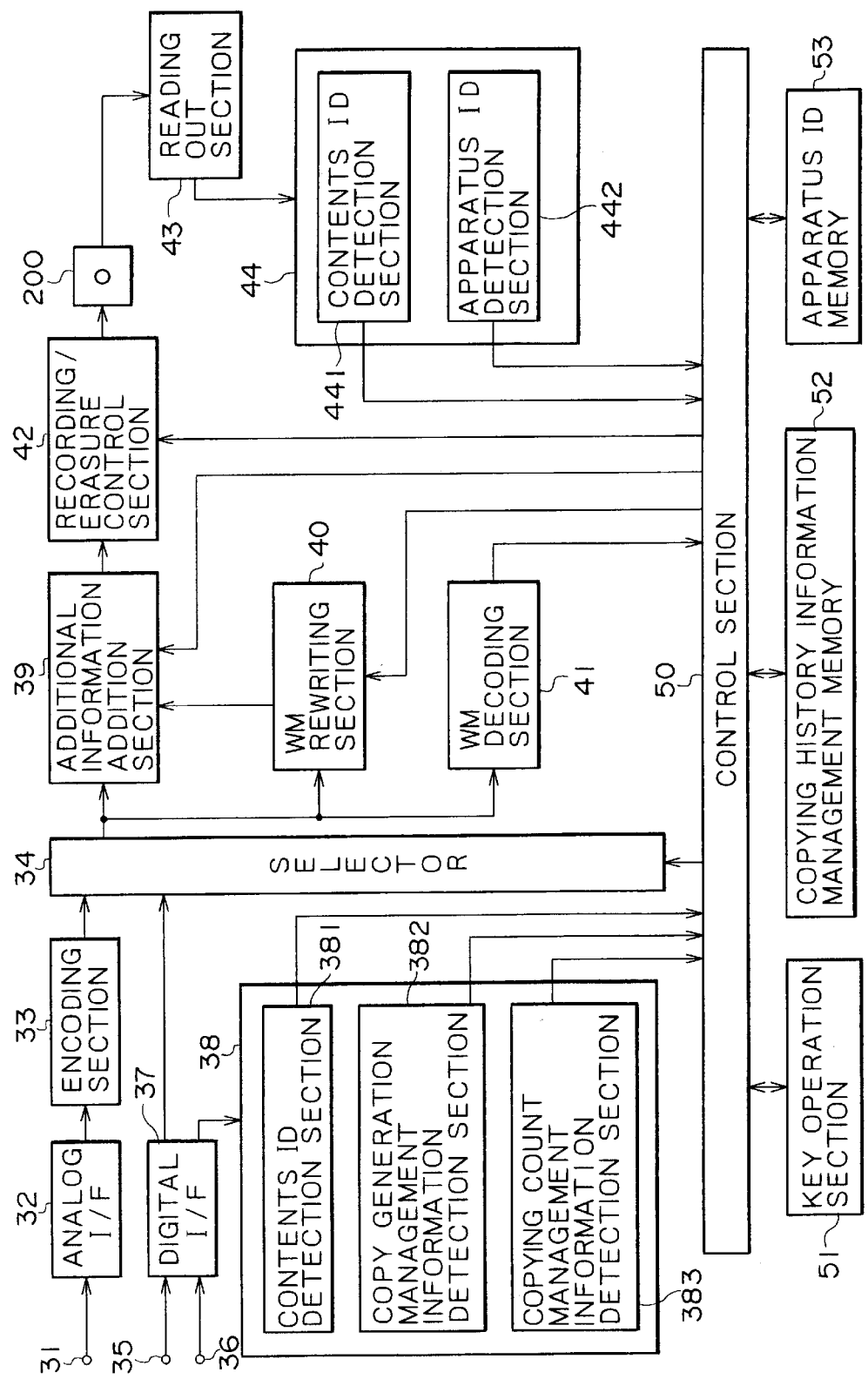
FIG. 3 is a block diagram of a recording apparatus of the first embodiment for recording an audio signal reproduced by and outputted from the reproduction apparatus shown in FIG. 2 onto a recording medium.

FIG. 3 shows a recording apparatus for an audio signal which receives an audio signal such as, for example, music data reproduced by and outputted from the CD player shown in FIG. 2 and records the audio signal onto a recording medium. In the present embodiment, the audio signal recording apparatus shown in FIG. 3 is a recording and reproduction apparatus (hereinafter referred to merely as MD apparatus) for an MD (mini disc). A magnetic disc such as a hard disc or a semiconductor memory may be used in place of an MD. It is to be noted that, in order to simplify description, description of an audio reproduction system of the MD apparatus is omitted.

Referring to FIG. 3, the MD apparatus in the present embodiment includes an input terminal 31 for an analog audio signal, an analog interface 32, a compression encoding section 33, a selector 34, an input terminal 35 for a digital audio signal, an input terminal 36 for digital additional information, a digital interface 37, an additional information detection section 38, an additional information addition section 39, an electronic watermark information rewriting section (hereinafter referred to as WM rewriting section) 40, an electronic watermark information decoding section (hereinafter referred to as WM decoding section) 41, a recording/erasure control section 42, a reading out section 43, an additional information detection section 44 for erasure audio information, a control section 50, a key operation section 51, a copying history information management memory 52, and an apparatus ID memory 53. An MD 200 used in the MD apparatus is a magneto-optical disk of a small size called mini disc as described hereinabove.

As seen from FIG. 3, the MD apparatus in the present embodiment includes the analog interface 32 and digital interface 37 so that an analog audio signal or a digital audio signal supplied thereto can be received and copied onto the MD 200, and can erase the audio signal copied on the MD 200 from the MD 200 when necessary.

"Copying of an Audio Signal onto the MD 200"

Music data in the form of an analog audio signal inputted through the input terminal 31 is supplied through the analog interface 32 to the compression encoding section 33, by which predetermined data compression processing is performed therefor, and resulting data is supplied to the selector 34.

On the other hand, music data in the form of a digital audio signal inputted through the input terminal 35 is supplied to the selector 34 through the digital interface 37. Meanwhile, additional information inputted through the input terminal 36 for digital additional information is supplied to the additional information detection section 38 through the digital interface 37.

The additional information detection section 38 includes a contents ID detection section 381, a copy generation management information detection section 382 and a copying count management information detection section 383 as seen in FIG. 3 and detects target additional information from information supplied thereto through the digital interface 37.

In particular, the contents ID detection section 381 detects a contents ID. The copy generation management information detection section 382 detects SCMS information as copy generation management information. The copying count management information detection section 383 detects a permitted number of times of copying as copying count management information. The contents ID, SCMS information and permitted number of times of copying detected by the components of the additional information detection section 38 are supplied to the control section 50.

The selector 34 selectively outputs one of the data from the compression encoding section 33 and the data from the digital interface 37 in accordance with a selector control signal inputted thereto from the key operation section 51 and representing a selective input from the user. The output data of the selector 34 is supplied to the recording/erasure control section 42 through the additional information addition section 39 and the WM rewriting section 40. The output data of the selector 34 is supplied also to the WM decoding section 41.

The WM decoding section 41 performs extraction and discrimination of the contents ID, SCMS information and permitted number of times of copying superposed as electronic watermark information on the output data of the selector 34 in the form of an audio signal. The discrimination output of the WM decoding section 41 is supplied to the control section 50.

The reason why the contents ID, SCMS information and permitted number of times of copying superposed as electronic watermark information are extracted and discriminated from the output data of the selector 34 by the WM decoding section 41 in this manner is that an analog audio signal may be supplied to the recording apparatus.

In particular, the CD 100S has music data in the form of a digital audio signal recorded thereon and has an contents ID, SCMS information and a permitted number of times of copying recorded in an area thereof different from that in which the digital audio signal is recorded. Therefore, even if a digital audio signal and additional information recorded on the CD 100S are read out, where the digital audio signal is converted into an analog audio signal and the resulting analog signal is outputted, the contents ID, SCMS information and permitted number of times of copying added to the area different from the area for the digital analog signal are not outputted.

Therefore, the contents ID, SCMS information and permitted number of times of copying as electronic watermark information which are superposed on the digital audio signal and which do not disappear and can be detected accurately when the digital audio signal is converted into an analog audio signal are detected by the WM decoding section 41.

Consequently, the MD apparatus in the present embodiment can acquire, from either of an analog audio signal and a digital audio signal, the contents ID, SCMS information and permitted number of times of copying corresponding to the audio signal.

It is to be noted that the WM decoding section 41 may be constructed otherwise such that it detects additional information in the form of electronic watermark information under the control of the control section 50 only when the selector 34 is switched by the user so that an audio signal from the compression encoding section 33 may be recorded onto the MD 200, that is, only when the recording apparatus processes an audio signal supplied thereto through the analog interface.

The MD apparatus of the present embodiment performs, for each apparatus and for each music data, management of the number of times of copying based on the contents ID, SCMS information and permitted number of times of copying of the music data in the form of an audio signal supplied thereto and the copy history information recorded in the copying history information management memory 52 of the MD apparatus itself.

In the MD apparatus of the present embodiment, when the SCMS information added to the music data instructed to be copied onto the MD 200 indicates inhibition of copying, the control section 50 controls the recording/erasure control section 42 to inhibit execution of copying of the audio signal onto the MD 200.

However, if the SCMS information added to the music data instructed to be copied onto the MD 200 indicates permission of copying for one generation, then the control section 50 refers to the copying history information management memory 52 of the MD apparatus itself to confirm whether or not copying history information having the contents ID of the music data instructed to be copied is stored already.

FIG. 4 illustrates copying history information stored in the copying history information management memory 52 in the present embodiment. As seen in FIG. 4, copying history information including a contents ID and a permitted number of times of copying is stored in the copying history information management memory 52.

If copying history information having the contents ID of the music data instructed to be copied is not found in the copying history information management memory 52, then the control section 50 in the present embodiment produces copying history information including the contents ID and the permitted number of times of copying added to the music data in the copying history information management memory 52.

Consequently, the copying history information corresponding to the music data instructed to be copied is provided in the copying history information management memory 52. Then, if the permitted number of times of copying of the copy history management information corresponding to music data instructed to be copied which is stored in the copying history information management memory 52 is 0, then the control section 50 determines that copying by the initial permitted number of times has been performed already, and controls the recording/erasure control section 42 to inhibit execution of copying of the music data.

On the other hand, if the permitted number of times of copying of the copy history information corresponding to music data instructed to be copied which is stored in the copying history information management memory 52 is one or more, then the control section 50 decrements the permitted number of times of copying of the copying history information by one to update the pertaining permitted number of times of copying of the copying history information stored in the copying history information management memory 52.

The control section 50 thus supplies the contents ID of the music data instructed to be copied, the SCMS information indicating inhibition of copying, the permitted number of times of copying and the apparatus ID to the additional information addition section 39.

Here, if the music data instructed to be copied has been supplied through the digital interface 37, then the contents ID and the permitted number of times of copying are the information which has been detected by the contents ID detection section 381 and the copying count management information detection section 383 of the additional information detection section 38, respectively. On the other hand, if the music data instructed to be copied has been supplied through the analog interface 32, then the contents ID and the permitted number of times of copying are information of the contents ID and the permitted number of times of copying extracted and discriminated by the WM decoding section 41.

Meanwhile, the SCMS information indicative of inhibition of copying is information formed, for example, by the control section 50. The apparatus ID is stored in advance in the apparatus ID memory 53 connected to the control section 50 and is information unique to the apparatus and allowing identification of the apparatus.

In particular, in the present embodiment, an apparatus ID unique to the recording apparatus is stored into the apparatus ID memory 53, for example, when the recording apparatus is manufactured, and then upon copying of music data, the apparatus ID is read out by the control section 50 and supplied to the additional information addition section 39 together with other additional information.

It is to be noted that the apparatus ID memory need not be provided as a separate memory, but alternatively, the apparatus ID may be stored, for example, in a ROM provided for the control section 50 and then read out from the ROM and supplied to the additional information addition section 39.

The additional information addition section 39 adds the contents ID, SCMS information, permitted number of times of copying and apparatus ID to the audio signal from the selector 34. Further, the control section 50 supplies the SCMS information indicative of inhibition of copying to the WM rewriting section 40. The WM rewriting section 40 spectrum spreads the SCMS information indicative of inhibition of copying from the control section 50 to form electronic watermark information and supplies the electronic watermark information to the additional information addition section 39.

Then, in the present embodiment, after the SCMS information in the form of electronic watermark information superposed has been removed already, the new SCMS information indicative of inhibition of copying in the form of electronic watermark information is superposed onto the music data to be copied onto the MD 200.

It is to be noted that it is not necessary to superpose the new electronic watermark information after the electronic watermark information superposed already is removed as described above, but the SCMS information indicative of inhibition of copying newly formed into electronic watermark information may alternatively be superposed at a position different from that at which the electronic watermark information superposed already on the audio signal is superposed. In other words, the SCMS information indicative of inhibition of copying in the form of electronic watermark information should be superposed on the music data to be copied so as to allow extraction and discrimination thereof.

In this manner, the music data to which the additional information has been added and whose SCMS information in the form of electronic watermark information has been rewritten by the additional information addition section 39 and the WM rewriting section 40 is supplied to the recording/erasure control section 42.

In this instance, since the music data supplied to the recording/erasure control section 42 is data whose copying by one generation is permitted, the recording/erasure control section 42 executes copying of the target music data onto the MD 200 under the control of the control section 50. Consequently, the music data in the form of an audio signal supplied from the CD player shown in FIG. 2 can be copied by a permitted number of times of copying by the MD apparatus of the present embodiment shown in FIG. 3 while the number of times of copying is managed where the audio signal is an audio signal of the first generation.

As described above, after copying of the music data is performed by the number of times of copying, since the permitted number of times of copying of the copying history information which is stored in the copying history information management memory 52 of the MD apparatus and has the contents ID of the music data is 0, the music data cannot be copied any more as described above.

FIG. 5A shows the CD 100S which is reproduced by the CD player shown in FIG. 2, and FIG. 5B shows the MD 200 onto which an audio signal reproduced by and outputted from the CD player is copied by the MD apparatus to which the audio signal is supplied.

As seen from FIG. 5A, the music data is stored on the CD 100S produced from the CD 100 produced in turn by the authoring apparatus shown in FIG. 1. The contents ID, SCMS information as copy generation management information and permitted number of times of copying as copying count management information are added to the music data and also superposed as electronic watermark information on the music data.

When the music data recorded on the CD 100S is reproduced by the CD player and supplied to the MD apparatus so that it is copied onto the MD 200 as seen in FIG. 5B, the contents ID, the SCMS information indicative of inhibition of copying as copy generation management information, the permitted number of times of copying as copy count management information and the apparatus ID of the MD apparatus are added to the music data to be copied onto the MD 200, and the contents ID, the SCMS information indicative of inhibition of copying and the permitted number of times of copying are superposed as electronic watermark information on the music data.

The SCMS information added to the music data to be recorded and superposed as electronic watermark information is SCMS information indicative of inhibition of copying as described hereinabove. Based on the SCMS information indicative of inhibition of copying, the music data copied on the MD 200 is inhibited from being copied onto another recording medium. In other words, the music data copied once onto the MD 200 is inhibited from being copied any more.

"Erasure of an Audio Signal Copied on the MD 200"

The MD apparatus of the present embodiment further has a function of erasing music data copied on the MD 200 as described above. When music data copied on the MD 200 is erased by the MD apparatus of the present embodiment, the permitted number of times of copying of the copying history information of the music data to be erased, which is stored in the copying history information management memory 52, is incremented by one.

Consequently, even if music data is copied once onto the MD 200, if the copied music data is thereafter erased from the MD 200, then further copying is permitted even after the music data has been copied by the initial permitted number of times of copying.

The MD apparatus of the present embodiment is constructed such that it can accept an instruction input from the user to erase data copied on the MD 200 through the key operation section 51. In this instance, the MD apparatus can be controlled so that all music data recorded on the MD 200 may be erased or target music data may be erased such as, for example, music data of a designated order number may be erased.

Then, if an erasing instruction is inputted by the user, then the control section 50 controls the reading out section 43 to read out additional information added to those of the music data recorded on the MD 200 the instruction of whose erasure has been inputted. The additional information read out is supplied to the additional information detection section 44 for an audio signal to be erased. The additional information detection section 44 includes a contents ID detection section 441 and an apparatus ID detection section 442 as seen in FIG. 3.

The contents ID detection section 441 detects the contents ID of the music data instructed to be erased. The apparatus ID detection section 442 detects the apparatus ID of an apparatus which has copied the music data instructed to be erased onto the MD 200. The detected contents ID and apparatus ID are supplied to the control section 50.

The control section 50 retrieves the copying history information of the copying history information management memory 52 based on the contents ID from the contents ID detection section 441. If copying history information having the same contents ID is not found or if copying history information having the same contents ID is found but the apparatus ID detected by the apparatus ID detection section 442 and the apparatus ID of the MD apparatus of the present embodiment are different from each other, since the music data to be erased has not been copied by the MD apparatus, the control section 50 controls the recording/erasure control section 42 to erase the music data instructed to be erased by the user from the MD 200.

However, if copying history information having the same contents ID as the contents ID detected by the contents ID detection section 441 is present and the apparatus ID detected by the apparatus ID detection section 442 and the apparatus ID of the MD apparatus of the present embodiment coincide with each other, then this signifies that the music data to be erased has been copied by the MD apparatus.

In this instance, the control section 50 increments the permitted number of times of copying of the corresponding copying history information stored in the copying history information management memory 52 by one and controls, in the present embodiment, the recording/erasure control section 42 to erase the music data instructed to be erased by the user from the MD 200.

Consequently, if the audio signal which has been copied onto the MD 200 by the MD apparatus and whose permitted number of times of copying is limited is tried to be erased by the MD apparatus, since the permitted number of times of copying of the copying history information stored in the copying history information management memory 52 is added by the number of times by which erasure is performed, copying by a number of times of copying of music data by which the music data is erased is permitted.

In short, the permitted number of times of copying in this instance corresponds to the number by which the music data can be formed by copying. Accordingly, if the permitted number of times of copying is a plural number and copying by a number of times equal to the permitted number of times of copying onto different recording media is executed, then the number of the recording media on which the music data is copied is equal to the initial value of the permitted number of times of copying of the audio signal.

After the music data recorded on the CD 100S is copied by the number of times equal to the initial permitted number of times of copying, further copying of the audio signal is not disabled. In other words, as long as the number of copied music data equal to the initial value of the permitted number of times of copying are present, copying of the music data is inhibited.

However, if the music data is erased using the MD apparatus by which it has been copied, since the permitted number of times of copying of the copying history information managed by the MD apparatus increases as described above, the music data is permitted to be further copied by the MD apparatus.

Consequently, copying of music data can be limited to protect the right of the proprietor of the copyright of the music data without narrowing the convenience to a user when the user tries, for example, to personally copy music data recorded on and provided as a CD onto another recording medium and enjoy it.

"Processing upon Copying, upon Erasure of Music Data"

Now, processing upon copying of music data which is performed by the MD apparatus of the present embodiment is described with reference to a flow chart of FIG. 6, and processing upon erasure of music data recorded on an MD is described with reference to a flow chart of FIG. 7.

Figure 6:
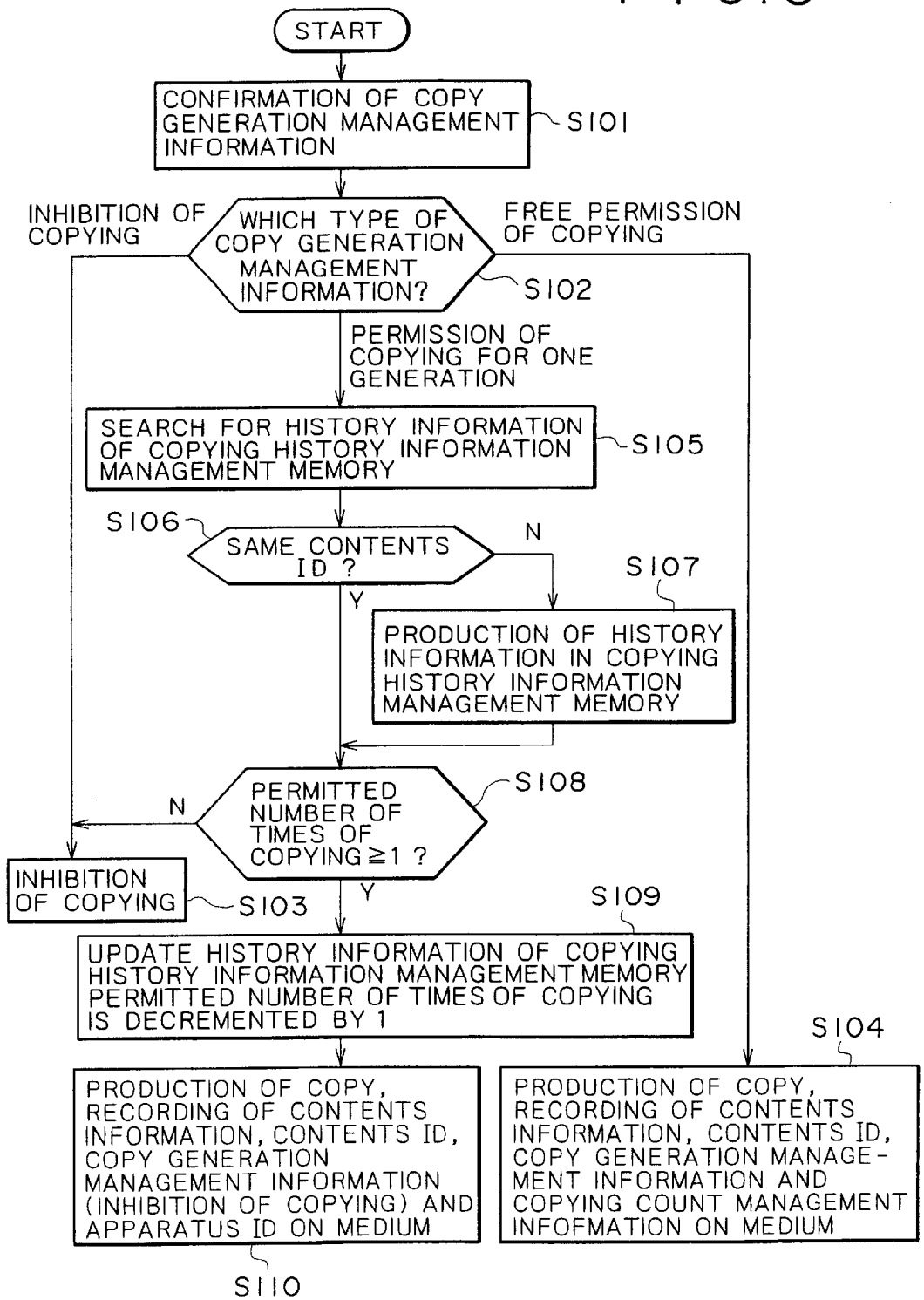
FIG. 6 is a flow chart illustrating a processing procedure of the recording apparatus shown in FIG. 3 when it copies contents information.
Figure 7:
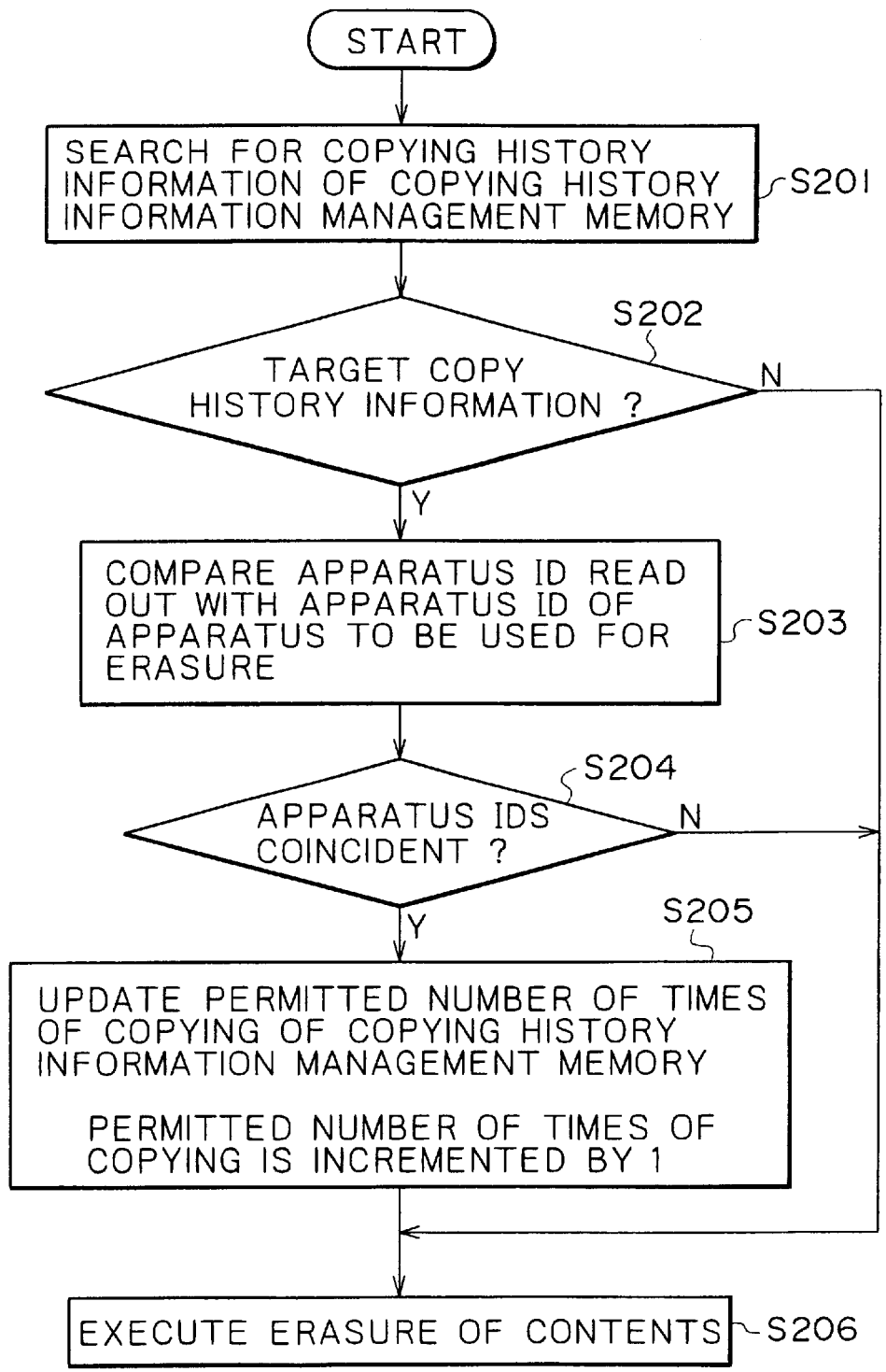
FIG. 7 is a flow chart illustrating processing of the recording apparatus shown in FIG. 3 when it erases contents information.

FIG. 6 is a flow chart illustrating a processing procedure of the MD apparatus of the present embodiment upon copying of music data. The processing procedure is executed when an instruction to start copying of music data supplied is inputted.

If an instruction to start copying is inputted through the key operation section 51 by the user, then the control section 50 controls the copy generation management information detection section 382 or the WM decoding section 41 to confirm SCMS information as copy generation management information detected from the music data supplied, for example, from a reproduction apparatus such as a CD player or an outputting apparatus of an information signal as described hereinabove (step S101).

Then, the control section 50 discriminates whether the SCMS information indicates inhibition of copying, permission of copying by one generation or free permission of copying (step S102). If the control section 50 discriminates in the discrimination processing in step S102 that the SCMS information confirmed indicates inhibition of copying, then it controls the recording/erasure control section 42 to inhibit execution of copying of the audio signal instructed to be copied (step S103).

If the SCMS information confirmed in the discrimination processing in step S102 otherwise indicates free permission of copying, then the control section 50 supplies a contents ID, the SCMS information as copy generation management information and a permitted number of times of copying as copying count management information detected by the additional information detection section 38 to the additional information addition section 39 so that the music data instructed to be copied may be copied onto a recording medium, in the present embodiment, the MD 200, together with the additional information. In this instance, the permitted number of times of copying is controlled to information which indicates that, since the music data is copy free, copying of the music data is permitted freely.

On the other hand, if the SCMS information confirmed in the discrimination processing in step S102 indicates permission of copying by one generation, then the control section 50 searches the copying history information of the copying history information management memory 52 based on the contents ID added to or superposed on the music data instructed to be copied (step S105) and confirms whether or not copying history information having the same contents ID is present (step S106).

If it is discriminated in the discrimination processing in step S106 that copying history information having the same contents ID as that of the music data instructed to be copied is not present, then the control section 50 produces copying history information which includes the contents ID of the music data instructed to be copied and the permitted number of times of copying in the copying history information management memory 52.

It is to be noted that, in the present embodiment, if the audio signal instructed to be copied has permission of copying by one generation but does not have a permitted number of times of copying added thereto, the control section 50 determines that the permitted number of times of copying of the music data is one and produces copying history information in which the permitted number of times of copying is 1.

If it is discriminated in the discrimination processing in step S106 that copying history information having the contents ID same as that of the music data instructed to be copied or after copying history information is produced in the copying history information management memory 52 by the processing in step S107, the control section 50 discriminates whether or not the permitted number of times of copying of the copying history information of the copying history information management memory 52 is equal to or greater than 1 (step S108).

If it is discriminated in the discrimination processing in step S108 that the permitted number of times of copying is 0, then the control section 50 determines that copying by the number of times initially permitted for the music data is completed already and advances its processing to step S103, in which it inhibits copying of the music data.

If it is discriminated in the discrimination processing in step S108 that the permitted number of times of copying is one ore more, then the control section 50 decrements the permitted number of times of copying of the copying history information stored in the copying history information management memory 52 by one (step S109).

Then, the control section 50 supplies the contents ID detected by the additional information detection section 38, the SCMS information formed by the control section 50 and indicative of inhibition of copying and the apparatus ID of the MD apparatus of the present embodiment stored in the ROM provided for the control section 50 to the additional information addition section 39 so that the music data to be copied is copied onto the MD 200 together with the additional information (step S110).

In this manner, the recording apparatus or recording and reproduction apparatus which performs copying of music data according to the present embodiment manages the permitted numbers of times of copying of music data and inhibits copying of music data if copying by the number of times initially permitted for the music data is completed. Consequently, the right of the proprietor of the copyright of the music data can be protected appropriately without narrowing the convenience to a user of music data.

Now, processing upon erasure of music data recorded on an MD which is performed by the MD apparatus of the present embodiment is described. FIG. 7 is a flow chart illustrating processing upon erasure of music data recorded on an MD by the MD apparatus of the present embodiment.

The MD apparatus of the present embodiment is constructed such that it can erase all of music data recorded on the MD 200 loaded in the MD apparatus or some of such music data such as, for example, designated music data. If such an erasure instruction is inputted through the key operation section 51 by the user, then the control section 50 executes the processing procedure illustrated in FIG. 7.

If an instruction to erase music data recorded on the MD 200 is inputted by the user, then the control section 50 reads out the contents ID of the designated music data and the apparatus ID from the MD 200 and searches the copying history information of the copying history information management memory 52 based on the read out contents ID (step S201).

Then, the control section 50 discriminates whether or not copying history information of the music data the user wants to erase is present (step S202). If the control section 50 discriminates in the discrimination processing in step S202 that copying history information of the target music data is present, then the control section 50 compares the apparatus ID read out from the MD 200 and the apparatus ID of the MD apparatus by which erasure of the music data is to be performed with each other (step S203) and discriminates whether or not they coincide with each other (step S204).

If it is discriminated in the discrimination processing in step S204 that the apparatus ID read out from the MD 200 and the apparatus ID of the MD apparatus coincide with each other, then since the music data instructed to be erased by the user has been copied onto the MD 200 by the MD apparatus, the control section 50 increments the permitted number of times of copying of the copy history information of the music data instructed to be erased by the user by one (step S205), and erases the music data instructed to be erased by the user, that is, the contents information, from the MD 200 (step S206).

On the other hand, if the control section 50 discriminates in the discrimination processing in step S202 that the copying history information corresponding to the music data instructed to be erased by the user is not present in the copying history information management memory 52, or if the control section 50 discriminates in the discrimination processing in step S204 that the apparatus ID added to the music data instructed to be erased by the user and the apparatus ID of the MD apparatus which is to execute erasure of the music data do not coincide with each other, then the control section 50 controls so that updating of the permitted number of times of copying of the copying history information is not performed but the music data instructed to be erased by the user is merely erased from the MD 200 (step S200).

If the apparatus performs erasure of music data having been copied onto a recording medium by the apparatus itself as described above, then the control section 50 controls so that the permitted number of times of copying of the copying history information recorded in the copying history information management memory 52 may be incremented by one. Consequently, for example, even if copying by an initial permitted number of times of copying has been performed for the erased audio signal, copying by a number of times recorded on the original CD 100S by which the audio signal is erased is further permitted.

In this instance, as described hereinabove, the permitted number of times of copying of the audio signal corresponds to the number of audio signals which have been copied onto and are present on recording media such as MDs. Accordingly, when music data copied is erased and consequently the permitted number of times of copying of the copying history information increases, then copying of the music data is permitted to be performed by a number corresponding to the increment. Consequently, a copying operation is controlled so that the right of the proprietor of the copyright of the music data can be protected appropriately without narrowing the convenience to users of the music data.

On the other hand, if an instruction to erase music data, which has not been copied by the apparatus itself, is inputted by the user, then the a warning message may be displayed on a liquid crystal display (LCD) unit provided on the MD apparatus or a light emitting diode (LED) for warning provided on the MD apparatus may be lit or blinked to notify the user that an instruction to erase music data which has not been copied by the MD apparatus itself has been inputted and to request the user for a confirmation input. By giving a warning to the user in this manner, it is possible to urge the user to perform erasure of the audio signal instructed to be erased using the apparatus by which the audio signal has been copied.

It is to be noted that, while, in the embodiment described above, contents information to be copied is an audio signal such as music data, such contents information is not limited to an audio signal, and the present invention can be applied also where a video signal or various computer data controlled to be communicated between computers are copied.

For example, where the contents information is a video signal, generation limitation to copying of the video signal can be performed by adding CGMS information as copy generation management information as described above. If a contents ID and copying count management information are added in addition to the CGMS information, then it is possible to manage the copying number of times and control copying based on the number of times of copying similarly as in the system which copies music data described above.

Copying generation management information is not always necessitated irrespective of what information signal the contents information is. In particular, if a contents ID with which contents information can be identified and copying count management information are added in a corresponding relationship to the contents information, then it is possible for a recording apparatus or a recording and reproduction apparatus to manage the number of times of copying based on the contents ID and the copying count management information and appropriately perform control upon copying of contents information in accordance with the managed number of times of copying.

Further, while, in the embodiment described above, an audio signal such as music data as contents information is recorded on and provided as a CD, the present invention is not limited to this. The present invention can be applied to a case wherein contents information is provided through direct broadcasting or broadcasting of a terrestrial wave or else through various broadcasting media which provide various broadcasting programs through a cable or another case wherein various contents information is provided through a network such as the Internet.

In this instance, an outputting apparatus for contents information which provides contents information through direct broadcasting or terrestrial broadcasting or through a cable or a network such as the Internet should be constructed such that it may add a contents ID, copy generation management information, copying count management information and so forth to contents information to be outputted. Accordingly, an outputting apparatus for contents information can be constructed by replacing the recording processing section 9 described hereinabove with reference to FIG. 1 with an outputting processing section which forms a signal to be outputted.

In this instance, the outputting apparatus for contents information can be applied not only to a broadcasting apparatus but also to various types of outputting apparatus which output contents information such as an information apparatus such as a personal computer which has a communication function.

Where contents information is provided through direct broadcasting or terrestrial broadcasting or through a cable, a receiver such as a set top box which receives a target broadcasting signal, processes the broadcasting signal into a signal of an available form and outputs the signal corresponds to such a reproduction apparatus as the CD player described above.

Further, while, in the embodiment described above, the recording medium onto which an audio signal is to be recorded as contents information is an MD (mini disc), the recording medium is not limited to this. For example, the recording medium onto which contents information is to be recorded may be a solid-state memory made of a semiconductor, or may not to be limited to a removable medium or may be a hard disc built in an apparatus.

Further, various recording media can be used such as an optical disc such as a DVD (Digital Video Disc) or a CD-R (Compact Disc Recordable), a magneto-optical disc, a magnetic disc or a magnetic tape such as a video tape or a cassette tape.

Accordingly, the recording apparatus is not limited to an MD apparatus, and the recording apparatus according to the present invention can be applied to various recording apparatus or recording and reproduction apparatus such as, for example, recording apparatus or recording and reproduction apparatus for various optical discs, recording apparatus or recording and reproduction apparatus for a magneto-optical disc, recording apparatus or recording and reproduction apparatus for various magnetic discs, video tape recorders, digital video tape recorders, audio tape recorders or digital audio tape recorders called DAT, and personal computers which receive contents information supplied thereto and record the contents information onto various recording media.

It is to be noted that, where the recording medium onto which contents information is copied is a CD-R, an ID called RID (Recorder ID) can be used as the apparatus ID.

Further, in the embodiment described above, a spectrum spreading technique is utilized to form electronic watermark information of a contents ID, copy generation management information and copying count management information, which is superposed on contents information. However, formation of electronic watermark information is not limited to that which employs a spectrum spreading technique, and it is possible to employ various electronic watermark techniques such as time masking or frequency masking to form electronic watermark information to be superposed on contents information. In this instance, a WM decoding section conforming to the electronic watermark technique used for formation of electronic watermark information is used.

Further, in the embodiment described above, upon copying of contents information, a controller or the like may control such that an apparatus ID is superposed as electronic watermark information on an information signal to be copied. In this instance, the controller or the like may control such that, upon erasure of the copied contents information, the apparatus ID in the form of electronic watermark information is detected.

Furthermore, in the embodiment described above, a permitted number of times of copying of a CD which is produced from a CD produced by an authoring apparatus and provided to a user is not rewritten. However, the permitted number of times of copying may be rewritten each time copying is performed to manage the permitted number of times of copying of contents information recorded on the medium.

In this instance, even if it is discriminated by referring to the permitted number of times of copying recorded on the recording medium that the contents information recorded on the recording medium is contents information whose copying is permitted for one generation, if the contents information has been copied already for the number of times permitted, then copying of the contents information can be inhibited to protect the right of the proprietor of the copyright appropriately because, the permitted number of times of copying is set, for example, to 0.

Then, if a permitted number of times of copying as copying count management information is added to and provided together with various contents information such as an audio signal, a video signal or computer data and a recording apparatus or a recording and reproduction apparatus which performs copying of the contents information manages the permitted number of times of copying, then management of the permitted number of times of copying can be performed in addition to conventional copy generation management based on SCMS information or CGMS information. Consequently, the problem of the conventional copy generation management that contents information of the first generation can be copied any number of times can be eliminated.

Further, since a conventional copy generation management system such as the SCMS or the CGMS and management of the number of times of copying can be used commonly, finer copying control can be achieved.

On the other hand, where contents information does not have copying count management information, if contents information other than contents information whose copying is inhibited or free is handled as contents information which can be copied only once, then also the permitted number of times of copying can be managed also for a conventionally existing medium. Consequently, the right of the proprietor of the copyright of the music data can be protected appropriately without narrowing the convenience to users of the music data.

Further, since a contents ID or a permitted number of times of copying remains in a recording apparatus or the copying history information management memory of a recording apparatus, it can be used, for example, for search of copied contents information in the apparatus.

On the other hand, when contents information copied on a recording medium is erased by a user, the permitted number of times of copying is increased by a number equal to a number of times of such erasure. Consequently, while such personal use of contents information that a user temporarily copies contents information onto a recording medium and utilizes the copied contents information using a car stereo apparatus or a portable reproduction machine can be performed similarly as in the prior art, it is possible to inhibit illegal copying such as to make and sell a large number of copies of contents information.

Further, since an apparatus ID from which an apparatus by which copying onto a recording medium has been performed can be specified is recorded, the apparatus by which copying has been performed can be specified.

Further, since a recording apparatus manages copying history information, a conventionally existing reproduction apparatus or the like can be continuously used as it is. For example, since a CD (compact disc) has an ISRC code added thereto already and a recording apparatus controls so that the ISRC code is outputted as a contents ID through a digital interface (IEC 958), an apparatus which executes copying can identify any contents information and manage the permitted number of times of copying for such contents information by utilizing the ISRC code.

Furthermore, where a contents ID, copy generation management information and copying count management information are added as electronic watermark information to contents information as described above, even if a conventional reproduction apparatus or the like is used in analog connection, the permitted number of times of copying of contents information can be managed.

Further, since the permitted number of times of copying need be managed only with regard to contents information whose copying is permitted only for one generation, if a recording apparatus controls so that copying history information regarding contents information whose copying is inhibited or free is not left in a copy history information management memory, then the copying history information management memory of a recording apparatus or a recording and reproduction apparatus which executes copying of contents information can be utilized effectively.

It is to be noted that the copying history information management memory may be, for example, a memory which can be removably mounted on a recording apparatus or a recording and reproduction apparatus. This provides an advantage that, even if a user uses a plurality of recording apparatus and/or recording and reproduction apparatus, copying history information can be managed in a centralized fashion.

Second Embodiment

A second preferred embodiment of the present invention is described below.

"Outline of an Information Signal Copying Controlling Method"

First, an outline of an information signal copying controlling method and an information signal reproduction controlling method employed in the present embodiment is described. The information signal copying controlling method of the present embodiment selects a copying controlling method to be used to copy an information signal taking it into consideration what information signal a recording medium used is designed to record thereon, what information signal an apparatus used to execute copying is designed to record, and which one of normal rate copying and high rate copying is to be used to execute copying of an information signal.

It is to be noted that, in the following description of the present embodiment, contents information signifies an audio signal, a video signal or the like which is evaluated principally in regard to contents thereof themselves and involves the copyright and so forth such as software for enjoyment of music or a movie, and an information signal signifies various information such as computer data including contents information.

Meanwhile, as the recording medium to be used, an audio/video recording medium onto which one or both of an audio signal and a video signal are recorded and a general purpose data recording medium onto which various information signals such as computer data can be recorded are available.

Further, as the recording apparatus to be used, an audio/video-only apparatus which is an apparatus for exclusive use to record and/or reproduce an audio signal and/or a video signal, an audio/video general purpose apparatus with an audio/video interface which is a general purpose apparatus such as a computer which can effect various information processing such as production and editing of an information signal and is constructed so that it can record an audio signal and/or a video signal supplied thereto onto a recording medium, and a general purpose apparatus for general purpose data with a general purpose interface which is constructed so that it can record general purpose data such as computer data supplied thereto onto a recording medium are available.

When time series data such as, for example, an audio signal or a video signal which varies as time passes is to be copied onto a recording medium, some apparatus which records an information signal onto a recording medium can select, for example, in response to an instruction from the user or in response to the type of a recording medium onto which an information signal is to be recorded, normal rate copying wherein an information signal reproduced at a standard reproduction rate is recorded at a rate equal to the standard reproduction rate or high rate copying wherein an information signal is copied at a rate higher than that in normal rate copying. The high rate copying can be achieved by performing processes from a reading out process of an information signal by a reproduction apparatus to a recording process of the information signal by a recording apparatus in a synchronized relationship with one other at a raised rate.

In this manner, each of the recording medium, recording apparatus and recording rate is not limited to one type but includes at least two types. Therefore, a copying controlling method to be used for copying of an information signal is selected in response to the recording medium, recording apparatus and recording rate as described above. Consequently, although copying within the range of personal utilization wherein contents information is copied in order for the user to enjoy the contents information by itself is permitted, such illegal copying that, for example, a person who is not authorized produces a large number of copies of contents information in order to benefit from them is prevented with certainty thereby to secure the benefits and the right of the proprietor of the copyright of the contents information which makes a target of such copying.

It is to be noted that the present embodiment is described below taking as an example a case wherein, for example, music data as contents information recorded on and provided as a recording medium such as a CD to a user is reproduced and supplied to a recording apparatus, by which it is copied onto a recording medium.

In this instance, each music data recorded on and provided as a recording medium has SCMS information added thereto so as to allow generation limitation control of the SCMS method described hereinabove, and further has added thereto as identification information a contents ID for identification of the music data such as an ISRC (International Standard Recording Code).

Further, the present embodiment uses, as a copying controlling method to be selected, the SCMS method described above and another method which employs more severe copying limitation than the SCMS method and is called uni-copy system (hereinafter referred to briefly as UCS) in the description of the second embodiment.

According to the UCS method, contents IDs of music data copied on a recording medium are stored in a memory of a recording apparatus, and copying of music data having a contents ID same as any of the contents IDs stored in the memory is inhibited. Consequently, the same recording apparatus permits copying of each music data but only one time.

Further, in the present embodiment, when a recording apparatus recognizes that appropriate copying control of an information signal cannot be performed with any of the SCMS method and the UCS method, the recording apparatus is controlled so as to inhibit copying of the music data. In other words, also it is one of copying controlling methods to control a recording apparatus to inhibit copying of contents information from the beginning.

FIG. 8 illustrates the information signal copying controlling method of the present embodiment and shows a recording medium, a recording apparatus and a recording rate such as, for example, a rate for normal rate copying or high rate copying, which are used for copying, and a copying controlling method which depends upon such information in a coordinated relationship.

Referring to FIG. 8, where an audio/video-only apparatus is used, when it is used to effect normal rate copying of music data as contents information onto an audio/video recording medium, copy generation limitation control of the SCMS method is performed using SCMS information added to the music data. This combination of the recording medium, recording apparatus and recording rate is the same as that upon ordinary copying which is performed in a home or the like, and since contents information is copied by normal rate copying, a large number of copies cannot be produced in a short time. Therefore, copying control is performed using the copy generation limitation control of the SCMS method.

When an audio/video-only apparatus is used to effect high rate copying of contents information onto an audio/video recording medium, copying control of the UCS method is performed. In this instance, since a large number of copies may possibly be produced in a short time by high rate copying, copying control is performed in accordance with the UCS method which uses more severe copying limitation than the SCMS method.

When an audio/video-only apparatus is used to copy contents information onto a general purpose recording medium, copying of contents information is inhibited. In particular, if contents information such as an audio signal or a video signal is copied onto a general purpose recording medium, then there is a possibility that the copied contents information may be copied as general purpose data freely without being limited by a general purpose apparatus. Therefore, copying itself of contents information is inhibited and disabled.

On the other hand, where an audio/video general purpose apparatus provided with an audio/video interface is used, when it is used to effect normal rate copying of contents information onto an audio/video recording medium, copying control of the UCS method which uses more severe copying limitation than copying generation limitation control of the SCMS method is performed.

The reason why copying control of the UCS method is used although normal rate copying is performed is that, since a general purpose apparatus such as, for example, a computer allows simple and high rate copying from its characteristic and can distribute contents information to a large number of other general purpose apparatus or receive and copy contents information distributed thereto over a network such as, for example, the Internet, the possibility that illegal copying may be performed is high.

When an audio/video general purpose apparatus is used to effect high rate copying of contents information onto an audio/video recording medium, copying control of the UCS method is performed. Also in this instance, since the possibility that a large number of copies may be produced in a short time is high as described above, copying control of the UCS method which uses more severe copying limitation than the SCMS method is performed.

When an audio/video general purpose apparatus is used to copy contents information onto a general purpose data recording medium, copying of contents information is inhibited. This is because, in this instance, if contents information such as an audio signal or a video signal is copied onto a general purpose data recording medium, then there is the possibility that the copied contents information may be copied freely without being limited at all as described above.

On the other hand, where a general purpose apparatus for general purpose data provided with a general purpose interface is used, when it is used to copy information onto an audio/video recording medium, copying of an information signal is inhibited irrespective of normal rate copying or high rate copying as seen from FIG. 8. The reason is that a general purpose apparatus for general purpose data can copy contents information such as, for example, an audio signal or a video signal whose copying is inhibited onto an audio/video recording medium without providing any limitation to copying.

It is to be noted that, as seen from FIG. 8, when a general purpose apparatus for general purpose data is used to record an information signal onto a general purpose data recording medium, there is no guarantee that copying limitation control is performed. Since a general purpose apparatus for general purpose data is an apparatus which handles general purpose data, it sometimes does not perform copy generation limitation control of the SCMS method or the copying limitation control of the UCS method which is performed for contents information such as an audio signal.

However, as hereinafter described, an audio/video-only apparatus or an audio/video general purpose apparatus inhibits reproduction of an information signal recorded on a general purpose data recording medium so that the contents information such as an audio signal or a video signal recorded on the general purpose data recording medium may not be reproduced by a general purpose apparatus for general purpose data. In short, even if an audio signal or a video signal is recorded on a general purpose data recording medium, since it cannot be reproduced, illegal copying of the audio signal or the video signal is prevented.

In this manner, when the possibility that illegal copying may be performed is high such as when there is the possibility that a large number of copies may be produced in a short time, a recording apparatus performs coping control of the UCS method which uses comparatively severe copying control, but when contents information such as an audio signal or a video signal can be copied without being subject to copying limitation or when copying of copied contents information is allowed, copying is inhibited so that the benefits and the right of the proprietor of the copyright of the contents information may be secured.

On the other hand, where an audio/video-only apparatus or an audio/video general purpose apparatus is used and an audio/video recording medium is used as a recording medium, if copying of contents information instructed to be copied by the user is not inhibited, then the contents information is permitted to be copied at least once. Consequently, copying of contents information within the range of personal utilization of the user is permitted, and the convenience to the user can be secured.

"Audio/Video-Only Apparatus"

Now, an audio/video-only apparatus of the second embodiment described above is described.

Figure 9:
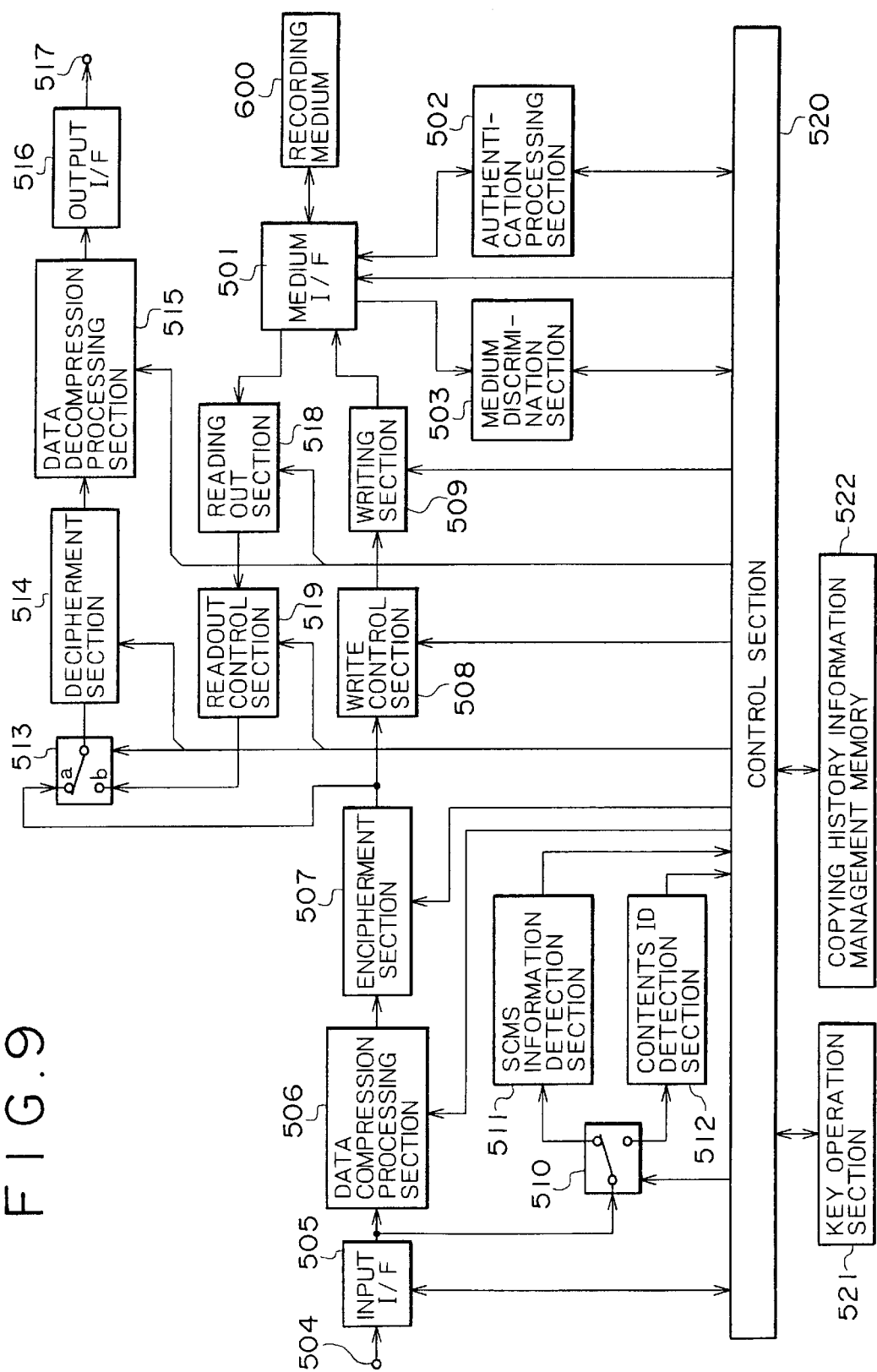
FIG. 9 is a block diagram of an audio/video apparatus serving as a recording apparatus and a reproduction apparatus of the second embodiment.

FIG. 9 is a block diagram showing the audio/video-only apparatus of the present embodiment. The audio/video-only apparatus of the present embodiment is formed as a recording and reproduction apparatus having a recording function of recording music data or the like as contents information onto a recording medium and a reproduction function of reproducing music data as contents information recorded on a recording medium.

Referring to FIG. 9, the audio/video-only apparatus of the present embodiment includes a medium interface (represented as medium I/F in FIG. 9) 501, an authentication processing section 502, a medium discrimination section 503, an input terminal 504, an input interface (represented as input I/F in FIG. 9) 505, a data compression processing section 506, an encipherment section 507, a writing control section 508, a writing section 509, a switching section 510, an SCMS information detection section 511, a contents ID detection section 512, another switching section 513, a decipherment section 514, a data decompression processing section 515, an output interface (represented as output I/F in FIG. 9) 516, an output terminal 517, a reading out section 518, a reading out control section 519, a control section 520, a key operation section 521, and a copying history information management memory 522.

Further, in the audio/video-only apparatus of the present embodiment, for a recording medium 600, a recording medium which employs a magneto-optical disc of a small size called MD (mini disc) or a semiconductor memory as a data storage area, a magnetic disc such as a hard disc, or the like may be used. In this instance, higher rate processing can be achieved where data is written into a semiconductor memory than where data is written onto a magneto-optical disc by the audio/video-only apparatus.

Therefore, as described later, in the audio/video-only apparatus of the present embodiment, high rate copying can be performed onto a recording medium wherein a semiconductor memory is used as a storage area, but normal rate copying is performed onto a recording medium wherein an MD is used as a storage area.

Further, as described hereinabove, an audio/video recording medium and a general purpose data recording medium are available for the recording medium 600. Therefore, an audio/video recording medium 600A and a general purpose data recording medium 600B which are used in the present embodiment are described.

Figure 10:
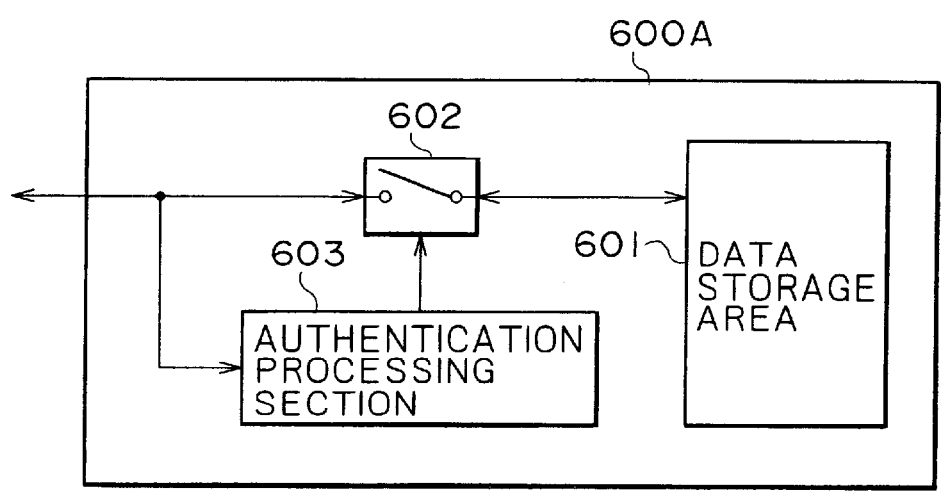
FIG. 10 is a diagrammatic view showing an audio/video recording medium of the second embodiment.
Figure 11:
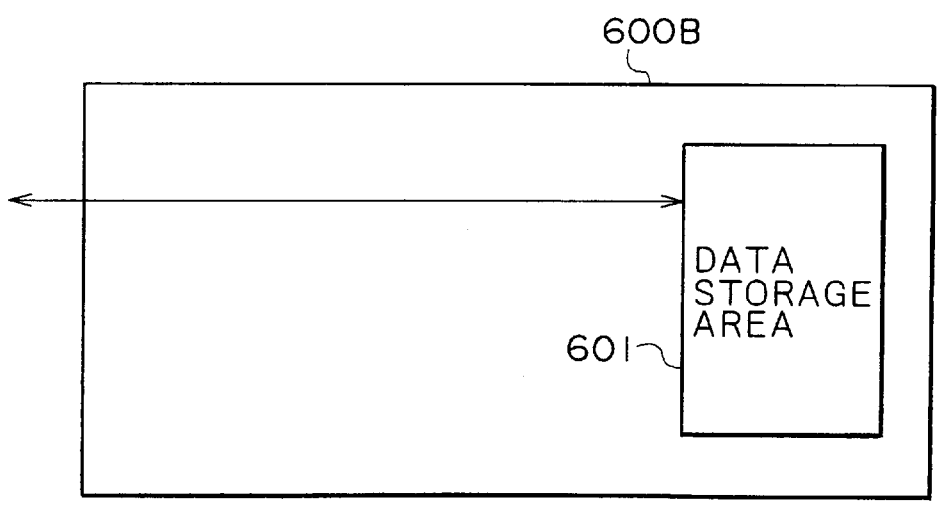
FIG. 11 is a similar view but showing a recording medium for general purpose data of the second embodiment.

FIG. 10 shows the audio/video recording medium 600A while FIG. 11 shows the general purpose data recording medium (hereinafter referred to as general purpose recording medium) 600B.

As seen from FIG. 10, the audio/video recording medium 600A of the present embodiment includes a data storage area 601 formed from a disc or a semiconductor memory, a switch circuit 602, and an authentication processing section 603. The authentication processing section 603 communicates with the other party apparatus, in which the audio/video recording medium 600A is loaded, to establish authentication with the other party apparatus.

In particular, the authentication processing section 603 discriminates whether or not the other party apparatus can access the data storage area 601 and authenticates the other party apparatus when it discriminates that the other party apparatus can access the data storage area 601. Then, when the other party apparatus is authenticated, the authentication processing section 603 switches the switch circuit 602 on to enable accessing to the data storage area 601. On the other hand, when the authentication processing section 603 does not authenticate the other party apparatus, the authentication processing section 603 does not switch the switch circuit 602 on. Consequently, the other party apparatus fails to access the data storage area 601.

Since the audio/video recording medium 600A includes the authentication processing section 603, it permits only an apparatus which has been authenticated thereby to write data into the data storage area 601 or read out data from the data storage area 601.

As seen from FIG. 11, the general purpose recording medium 600B of the present embodiment includes a data storage area 601 but does not include such a switch circuit 602 or an authentication processing section 603 as those in the audio/video recording medium 600A. Accordingly, the general purpose recording medium 600B permits various general purpose data to be recorded into the data storage area 601 or permits data stored in the data storage area 601 to be read out by various apparatus without intervention of an authentication process.

In this manner, in the present embodiment, the audio/video recording medium 600A shown in FIG. 10 and the general purpose recording medium 600B shown in FIG. 11 are available as the recording medium 600.

Referring back to FIG. 9, the audio/video-only apparatus includes the authentication processing section 502 in order that it can discriminate whether the recording medium loaded therein is the audio/video recording medium 600A or the general purpose recording medium 600B.

The audio/video-only apparatus further includes the medium discrimination section 503 in order to discriminate whether the recording medium is a recording medium wherein a semiconductor memory which allows high rate copying is used as the data storage area 601 or another recording medium wherein a magneto-optical disk which only allows normal rate copying is used as the data storage area 601.

In particular, if a recording medium is loaded into the audio/video-only apparatus of the present embodiment shown in FIG. 9, then the control section 520 first controls the medium interface 501 and the authentication processing section 502 to establish authentication with the loaded recording medium. Then, if the control section 520 has successfully established authentication with the loaded recording medium, then it controls the medium interface 501 and the medium discrimination section 503 to discriminate whether or not the loaded recording medium is a recording medium which allows high rate copying.

In particular, the authentication processing section 502 performs processing of communicating with the authentication processing section 603 of the recording medium and authenticating the recording medium through the medium interface 501. In this instance, if the recording medium loaded in the audio/video-only apparatus is the general purpose recording medium 600B which does not include the authentication processing section 603, then since authentication is not established between the general purpose recording medium 600B and the audio/video-only apparatus of the present embodiment, the authentication processing section 502 of the audio/video-only apparatus notifies the control section 520 that it has failed in establishment of authentication. When authentication is not established in this manner, the control section 520 can determine that the recording medium loaded is the general purpose recording medium 600B which does not include the authentication processing section 603.

Then, when the loaded recording medium is the general purpose recording medium 600B, the control section 520 controls the writing control section 508 to inhibit writing of data into the recording medium. In this manner, the audio/video-only apparatus of the present embodiment is controlled so that music data as contents information cannot be copied onto the general purpose recording medium 600B.

Further, when the loaded recording medium is the general purpose recording medium 600B, the control section 520 controls the reading out control section 519 to inhibit reading out of data recorded on the general purpose recording medium 600B loaded in the audio/video-only apparatus. Consequently, the audio/video-only apparatus of the present embodiment is also controlled so that it cannot reproduce data recorded on the general purpose recording medium 600B.

On the other hand, if the other party recording medium is the audio/video recording medium 600A which includes the authentication processing section 603, then since authentication is established between the audio/video-only apparatus and the audio/video recording medium 600A of the other party, the authentication processing section 502 notifies the control section 520 that authentication has been established. When authentication is established in this manner, the control section 520 can determine that the loaded recording medium is the audio/video recording medium 600A which includes the authentication processing section 603.

Further, when authentication is established, the authentication processing section 603 of the audio/video recording medium 600A switches the switch circuit 602 on as described above to permit the audio/video-only apparatus to access the data storage area 601.

In this instance, the medium discrimination section 503 acquires, for example, information representative of the type of the medium recorded on the loaded recording medium through the medium interface 501, discriminates whether the recording medium is a recording medium which employs a magneto-optical disc as the data storage area 601 or a recording medium which employs a semiconductor memory, and notifies the control section 520 of a result of the discrimination.

In the audio/video-only apparatus of the present embodiment, a recording medium wherein a magneto-optical disc is used as the data storage area 601 allows only normal rate copying, but another recording medium wherein a semiconductor memory is used as the data storage area 601 allows high rate copying as described hereinabove.

Therefore, when the result of the discrimination from the medium discrimination section 503 indicates that the loaded recording medium is a recording medium wherein a magneto-optical disc is used as the data storage area 601, the control section 520 forms a controlling signal for switching the switching section 510 to the SCMS information detection section 511 side and supplies the controlling signal to the switching section 510 in order to effect copying control of the SCMS method.

On the other hand, when the result of the discrimination from the medium discrimination section 503 indicates that the loaded recording medium is a recording medium wherein a semiconductor memory is used as the data storage area 601, the control section 520 forms a controlling signal for switching the switching section 510 to the contents ID detection section 512 side and supplies the controlling signal to the switching section 510 in order to effect copying control of the UCS method.

Consequently, as described hereinabove with reference to FIG. 8, when music data as contents information is to be copied by normal rate copying onto the audio/video recording medium 600A, the audio/video-only apparatus performs copying control of the SCMS method using SCMS information detected by the SCMS information detection section 511. On the other hand, when music data as contents information is to be copied by high rate copying onto an audio/video recording medium which uses a semiconductor memory as the data storage area 601 and allows high rate copying, the audio/video-only apparatus performs copying control of the UCS method using the contents ID detected by the contents ID detection section 512.

It is to be noted that the audio/video-only apparatus of the present embodiment is constructed such that the control section 520 can receive a clock signal for reproduction processing through the input terminal 504 and the input interface 505 together with an audio signal from a reproduction apparatus for a CD which is an audio signal reproduction apparatus and detect it based on the information from the input interface 505 whether normal rate copying or high rate copying should be performed. When high rate copying should be performed, the control section 520 controls components of the recording system to execute high rate copying.

Then, the audio signal such as audio data reproduced by the reproduction apparatus for a CD and inputted through the input terminal 504 of the audio/video-only apparatus of the present embodiment shown in FIG. 9 is supplied to the data compression processing section 506 and the switching section 510 through the input interface 505.

The data compression processing section 506 compresses the audio signal supplied thereto with a predetermined method and supplies the compressed audio signal to the encipherment section 507. The encipherment section 507 enciphers the compressed audio signal in accordance with a predetermined encipherment method and supplies a resulting audio signal to the writing control section 508 and the input terminal a side of the switching section 513.

On the other hand, where the recording medium 600 is the audio/video recording medium 600A which uses a magneto-optical disc as the data storage area 601, the switching section 510 is switched to the SCMS information detection section 511 side, but where high rate copying onto the audio/video recording medium 600A wherein a semiconductor memory is used as the data storage area 601 is to be performed, the switching section 510 is switched to the contents ID detection section 512 side.

Consequently, when the switching section 510 is switched to the SCMS information detection section 511 side, the audio signal from the input interface 505 is supplied to the SCMS information detection section 511 through the switching section 510. The SCMS information detection section 511 detects SCMS information added to the audio signal supplied thereto and supplies the detected SCMS information to the control section 520.

In this instance, the control section 520 analyzes the SCMS information supplied thereto and discriminates a state of copying control of the audio signal supplied. In particular, the control section 520 discriminates whether, with regard to the audio signal supplied, copying is inhibited or copying is permitted for one generation or otherwise copying is freely permitted. On the other hand, if the control section 520 fails to detect SCMS information from the audio signal supplied, then it determines in the present embodiment that copying of the music data is freely permitted. Alternatively, however, when SCMS information is not detected from the audio signal supplied, the control section 520 may control so that copying of the audio signal is inhibited.

Then, the control section 520 forms a control signal for controlling the writing control section 508 based on the state of copying control of the audio signal instructed to be copied by the user, which has been discriminated from the result of the analysis of the SCMS information, and supplies the control signal to the writing control section 508.

In particular, when the state of copying control of the audio signal instructed to be copied by the user indicates inhibition of copying, the control section 520 forms a control signal for inhibiting copying and supplies the control signal to the writing control section 508. However, when the state of copying control of the audio signal instructed to be copied by the user is permission of free copying, the control section 520 forms a control signal for permitting free copying and supplies the control signal to the writing control section 508.

On the other hand, when the state of copying control of the audio signal instructed to be copied by the user indicates permission of copying for one generation, the control section 520 forms a control signal for permitting copying and changing the added SCMS information to information which represents inhibition of copying and supplies the control signal to the writing control section 508.

The writing control section 508 supplies only the audio signal, whose copying is permitted, to the writing section 509 based on the control signal from the control section 520. In this instance, where the audio signal is a signal whose copying is permitted for one generation, the writing control section 508 in the present embodiment supplies the SCMS information to the writing section 509 after it changes the SCMS information so as to represent inhibition of copying.

Then, the writing section 509 performs necessary processing such as to adjust the recording level of the audio signal to be recorded and records the audio signal onto the recording medium 600 through the medium interface 501. Upon such recording, the medium interface 501 is controlled by the control section 520 so that the audio signal is recorded onto the recording medium 600.

Further, as described above, when high rate copying of the audio signal onto the audio/video recording medium 600A wherein a semiconductor memory is used as the authentication processing section 603 is to be performed, the switching section 510 is switched to the contents ID detection section 512 side so that copying control of the UCS method may be performed. In this instance, the audio signal from the input interface 505 is supplied to the contents ID detection section 512 through the switching section 510.

The contents ID detection section 512 detects the contents ID for identification of the audio signal added to the audio signal supplied and supplies the contents ID to the control section 520. In the copying history information management memory 522 connected to the control section 520, contents IDs of audio signals having been copied by the audio/video-only apparatus of the present embodiment are stored.

Then, the control section 520 searches the copying history information management memory 522 based on the contents ID from the contents ID detection section 512 to detect whether the same contents ID is stored in the copying history information management memory 522.

If the contents ID same as the contents ID from the contents ID detection section 512 is already stored in the copying history information management memory 522, then it can be determined that the audio signal instructed to be copied by the user has already been copied onto the recording medium by the audio/video-only apparatus. In this instance, since repeatedly copying of the same audio signal cannot be permitted, the control section 520 forms a control signal for inhibiting copying and supplies it to the writing control section 508.

On the other hand, if the contents ID same as the contents ID from the contents ID detection section 512 is not stored in the copying history information management memory 522, then it can be determined that the audio signal instructed to be copied by the user has never been copied by the audio/video-only apparatus as yet. In this instance, the control section 520 forms a control signal for permitting copying and supplies it to the writing control section 508. Further, the control section 520 additionally stores the contents ID from the contents ID detection section 512 into the copying history information management memory 522.

If the audio signal is a signal whose copying is permitted only once, then it is copied onto the recording medium 600 through the writing section 509 and the medium interface 501 as described above, but if the audio signal is a signal whose copying is inhibited, then the writing control section 508 does not supply the audio signal to the writing section 509, and consequently, copying of the audio signal is not performed.

When the audio signal is to be recorded onto the audio/video recording medium 600A as described above, the switching section 513 is switched to the input terminal a side under the control of the control section 520. Consequently, the audio signal from the encipherment section 507 is supplied through the switching section 513 to the decipherment section 514, by which it is deciphered. The deciphered audio signal is supplied to the data decompression processing section 515.

The data decompression processing section 515 decompresses the audio signal in the form of compressed data to restore the audio signal of a form before data compression. The thus restored audio signal is outputted through the output interface 516 and the output terminal 517. The audio signal outputted in this manner is supplied, for example, to a speaker or a headphone so that the audio signal to be recorded onto the audio/video recording medium 600A may be monitored by the user.

In this manner, the audio/video-only apparatus of the present embodiment is constructed such that it can perform copying control of the SCMS method where the recording medium onto which an audio signal instructed to be copied by the user is to be copied is an audio/video recording medium wherein the data storage area is a magneto-optical disc, but perform copying control of the UCS method where high rate copying is to be performed onto an audio/video recording medium wherein the data storage area is a semiconductor memory.

Now, reproduction of an audio signal recorded on a recording medium loaded in the audio/video-only apparatus of the present embodiment is described. Also upon reproduction, reproduction control is performed in response to a recording medium on which an audio signal instructed to be reproduced by the user is recorded as described above.

In particular, if a recording medium with which authentication cannot be established through the authentication processing section 502 is loaded in the audio/video-only apparatus of the present embodiment, then the audio/video-only apparatus determines that the recording medium on which the audio signal instructed to be reproduced by the user is the general purpose recording medium 600B as described hereinabove.

In this instance, the control section 520 controls the reading out control section 519 based on a result of discrimination from the authentication processing section 502 so that an audio signal read out from the general purpose recording medium 600B through the medium interface 501 and the reading out section 518 may not be outputted from the reading out control section 519 thereby to inhibit reproduction.

As described hereinabove, when an audio signal is to be copied onto a general purpose recording medium by means of a general purpose apparatus for general purpose data, there is the possibility that a copied audio signal may be copied without any limitation. However, since the audio/video-only apparatus cannot be used to reproduce data recorded on a general purpose recording medium as described above, it doesn't mean anything to the user that the user copies contents information such as an audio signal or a video signal onto a general purpose recording medium using a general purpose apparatus for general purpose data, and consequently, illegal copying of contents information copying of which is inhibited by SCMS information or like information can be prevented on the other hand, if authentication is established successfully between the audio/video-only apparatus of the present embodiment and a recording medium loaded in the audio/video-only apparatus, then the control section 520 can discriminate based on a notification from the authentication processing section 502 that the recording medium loaded is the audio/video recording medium 600A.

In this instance, the control section 520 controls the medium interface 501 and the reading out section 519 to supply an audio signal read out from the recording medium through the medium interface 501 and the reading out section 518 to the input terminal b of the switching section 513. In this instance, the control section 520 switches the switching section 513 to the input terminal b side.

Consequently, the audio signal read out from the audio/video recording medium 600A is supplied to a speaker or a headphone through the decipherment section 514, data decompression processing section 515, output interface 516 and output terminal 517 so that the user can enjoy sound reproduced from the audio signal read out from the audio/video recording medium 600A.

It is to be noted that, when authentication is established successfully and contents information is to be reproduced from the recording medium, a decipherment key is supplied from the authentication processing section 603 to the control section 520 through the authentication processing section 502 and then supplied to the decipherment section 514. Consequently, encipherment applied to the contents information read out from the recording medium by the audio/video-only apparatus is cancelled by the decipherment section 514 to thus decipher the contents information.

"Processing upon Recording of the Audio/Video-Only Apparatus"

Figure 12:
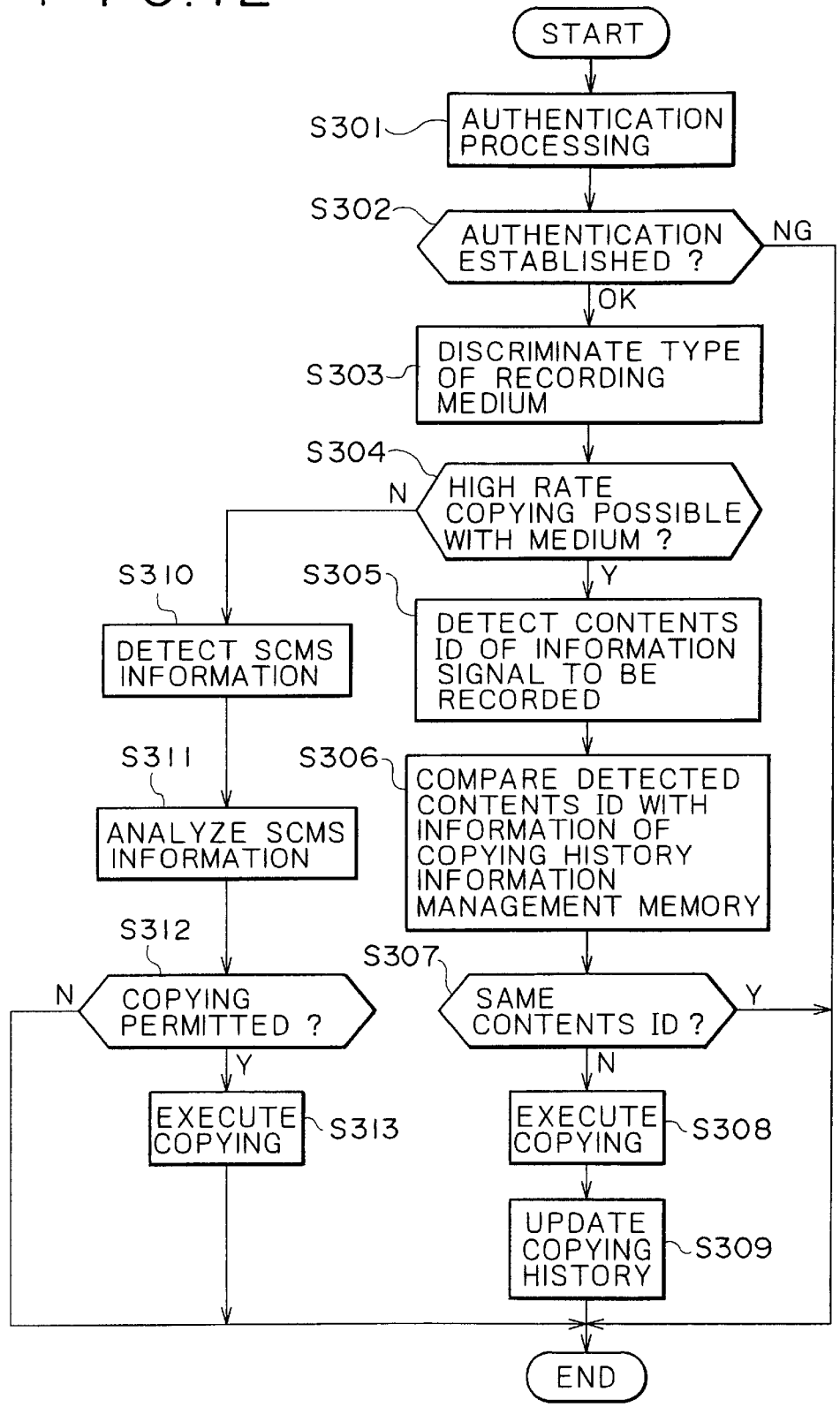
FIG. 12 is a flow chart illustrating a processing procedure executed by the audio/video apparatus shown in FIG. 9 when it records an information signal.

Now, processing upon recording of the audio/video-only apparatus of the present embodiment described above with reference to FIG. 9 is described with reference to a flow chart of FIG. 12. FIG. 12 illustrates a processing procedure when the audio/video-only apparatus of the present embodiment records an audio signal such as, for example, music data as contents information onto a recording medium.

If a recording medium is loaded into the audio/video-only apparatus of the present embodiment, then the control section 520 tries to establish authentication with the recording medium through the medium interface 501 and the authentication processing section 502 (step S301).

Then, the control section 520 discriminates whether or not authentication has been established (step S302). If authentication has not been established successfully, then the processing procedure illustrated in FIG. 12 is ended. In other words, if the loaded recording medium is the general purpose recording medium 600B which does not include the authentication processing section 603, then authentication is not established, and consequently, copying of an audio signal onto the general purpose recording medium 600B loaded and reproduction of data recorded on the general purpose recording medium 600B loaded cannot be performed by the audio/video-only apparatus.

If the control section 520 discriminates in the discrimination processing in step S302 that authentication has been established successfully, then the recording medium loaded in the audio/video-only apparatus of the present embodiment is the audio/video recording medium 600A which includes the authentication processing section 603, and copying of an audio signal is possible. In this instance, the control section 520 discriminates through the medium interface 501 and the medium discrimination section 503 whether or not the loaded recording medium is a recording medium onto which high rate copying can be performed (step S303).

In particular, the processing in step S303 is processing of discriminating whether the loaded recording medium is the audio/video recording medium 600A which employs a semiconductor memory for the data storage area 601 and allows high rate copying or the audio/video recording medium 600A which employs a magneto-optical disk for the data storage area 601 and allows only normal rate copying. Here, a magneto-optical disk or an optical disc may possibly allow high rate copying.

Then, the control section 520 discriminates based on a result of the discrimination from the medium discrimination section 503 whether or not the audio/video recording medium 600A loaded in the audio/video-only apparatus is a recording medium which allows high rate copying (step S304).

If the control section 520 discriminates in the discrimination processing in step S304 that the loaded recording medium is a recording medium which allows high rate copying and an audio signal is to be copied by high rate copying, then copying control of the UCS method is performed as described above. In particular, if the loaded recording medium is an audio/video recording medium and allows high rate copying and a reproduction clock signal supplied from the reproduction apparatus for an audio signal is ready for high rate copying, then since the switching section 510 is switched to the contents ID detection section 512 side as described hereinabove with reference to FIG. 9, the contents ID of the audio signal instructed to be copied by the user is detected by the contents ID detection section 512 and supplied to the control section 520 (step S305).

The control section 520 compares the contents ID from the contents ID detection section 512 with the contents IDs stored in the copying history information management memory 522 to search for the contents ID same as the contents ID of the audio signal instructed to be copied by the user (step S306).

Then, the control section 520 discriminates whether or not the contents ID same as the contents ID of the audio signal instructed to be copied by the user is present in the copying history information management memory 522 (step S307). If the control section 520 discriminates in the discrimination processing in step S307 that the same contents ID is present in the copying history information management memory 522, then since the audio signal of the contents ID has already been copied by the audio/video-only apparatus, the control section 520 controls the writing control section 508 so that the target music data may not be copied, thereby ending the processing procedure illustrated in FIG. 12.

On the other hand, if the control section 520 discriminates in the discrimination processing in step S307 that the same contents ID is not present in the copying history information management memory 522, then it controls the writing control section 508, writing section 509 and medium interface 501 to execute high rate copying of the target audio signal onto the audio/video recording medium 600A (step S308) and records the contents ID of the copied music data as copying history information into the copying history information management memory 522 to update the information of the copying history information management memory 522 (step S309).

If the control section 520 discriminates in the discrimination processing in step S304 that the recording medium loaded in the audio/video-only apparatus is not a recording medium which allows high rate copying, then copy generation limitation control of the SCMS method is performed as described hereinabove. In particular, when the loaded recording medium is an audio/video recording medium and allows only normal rate copying, the switching section 510 is switched to the SCMS information detection section 511 side as described hereinabove with reference to FIG. 9. Consequently, SCMS information added to the audio signal such as, for example, music data instructed to be copied by the user is detected by the SCMS information detection section 511 and supplied to the control section 520 (step S310).

Then, the control section 520 analyzes the SCMS information supplied thereto (step S311). Then, the control section 520 discriminates based on a result of the discrimination of the SCMS information whether or not the music data instructed to be copied by the user is music data copying of which is permitted and which therefore can be copied (step S312).

If the control section 520 discriminates in the discrimination processing in step S312 that copying of the target music data is inhibited and the target music data cannot be copied, then it controls the writing control section 508 so that the target music data may not be copied, thereby ending the processing procedure illustrated in FIG. 12.

If the control section 520 discriminates in the discrimination processing in step S312 that the target music data can be copied such as when the SCMS information added to the target music data indicates that copying is performed for one generation, then the control section 520 controls the writing control section 508, writing section 509 and medium interface 501 to execute normal rate copying of the target music data onto the recording medium (step S313).

It is to be noted that, when normal rate copying is executed in step S313 and copying of the music data to be copied is performed for one generation, the control section 520 controls so that the SCMS information which indicates inhibition of copying is added to and copied together with the information signal to be copied onto the recording medium.

In this manner, the audio/video-only apparatus of the present embodiment discriminates the recording medium onto which an audio signal such as, for example, music data is to be copied as contents information in accordance with an instruction from the user by deciding what information signal is designed to record thereon. Then, if the recording medium is an audio/video recording medium onto which an audio signal as contents information can be recorded, then the audio/video-only apparatus is controlled so that copying of the audio signal can be performed, but when the recording medium is a general purpose recording medium, the audio/video-only apparatus is controlled so that copying of the audio signal cannot be performed.

Then, when the audio/video-only apparatus effects normal rate copying of the audio signal onto an audio/video recording medium which only allows normal rate copying, copying control of the SCMS method is performed, but when the audio/video-only apparatus effects high rate copying onto an audio/video recording medium which allows high rate copying, copying control of the UCS method which uses more severe copying limitation than the SCMS method is performed.

Further, the audio/video-only apparatus is controlled so that copying of contents information onto a general purpose recording medium which may allow copying of a recorded information signal to be performed with a high degree of possibility without being subject to copying limitation cannot be performed. Further, when the audio/video-only apparatus performs copying of an audio signal many times in a short time to effect high rate copying by which a large number of recording media on which the audio signal is copied can be produced, since copying control of the UCS method is performed, production of a large number of copies is prevented. Consequently, illegal copying of contents information which may damage the benefits to the proprietor of the copyright of the music data can be prevented.

In particular, when normal rate copying of music data onto an audio/video recording medium is performed, copying control by the conventional SCMS method is performed, but when high rate copying of music data onto an audio/video recording medium is performed, copying control of the UCS method is performed. Consequently, since the audio/video-only apparatus permits copying of an audio signal within a range of personal utilization if copying of the audio signal is permitted, it does not narrow the convenience to the user.

It is to be noted that, in the audio/video-only apparatus of the present embodiment, the medium discrimination section 503 discriminates based on information recorded on a recording medium whether or not high rate copying onto the recording medium is possible. However, the method of such discrimination is not limited to this, and a recording medium which allows high rate copying and another recording medium which does not allow high rate copying may be discriminated from each other by a mechanical method making use of a difference between shapes of casings in which they are accommodated.

Further, in the audio/video-only apparatus of the present embodiment, whether normal rate copying should be performed or high rate copying should be performed is determined based on a recording medium loaded and a clock signal from a reproduction apparatus which supplies an audio signal to the audio/video-only apparatus of the present embodiment. However, the method of determination is not limited to this.

Whether normal rate copying should be performed or high rate copying should be performed may be determined depending only upon whether or not the recording medium loaded is a recording medium which allows high rate copying or may be determined otherwise depending upon a clock signal supplied from a reproduction apparatus of the audio signal.

Further, switching between normal rate copying and high rate copying can be performed in response to an initial input from the user to the audio/video-only apparatus. In short, the user may switch between normal rate copying and high rate copying through the key operation section 521 connected to the control section 520.

In this instance, it is not discriminated whether or not a recording medium allows high rate copying or it is not discriminated based on a clock signal from a reproduction apparatus for an audio signal whether or not high rate copying should be performed, but it is discriminated which one of normal rate copying and high rate copying has been selected by the user.

Then, when contents information is to be copied onto an audio/video recording medium by the audio/video-only apparatus of the present embodiment and normal rate copying is selected by the user, upon recording of an audio signal, copying control of the SCMS method is performed, but when high rate copying is selected, copying control of the UCS method which uses more severe copying limitation than the SCMS method is performed.

Consequently, also when a recording rate is selected by the user, copying control can be performed in accordance with an appropriate copying control method.

Further, the audio/video-only apparatus of the present embodiment is controlled so that an information signal recorded on the general purpose recording medium 600B cannot be reproduced as described hereinabove. Consequently, for example, even if contents information is copied illegally onto a general purpose recording medium by a general purpose apparatus which is hereinafter described, the contents information cannot be reproduced by an audio/video-only apparatus. Consequently, also illegal copying of contents information onto a general purpose recording medium can be prevented.

"Audio/Video General Purpose Apparatus"

Now, an audio/video general purpose apparatus of the present invention mentioned hereinabove is described. The audio/video general purpose apparatus of the present embodiment is a computer which can process an audio signal and/or a video signal and can perform copying of an audio signal or a video signal onto a recording medium, reproduction of an audio signal or a video signal recorded on a recording medium and other various processes such as production or editing of an audio signal or a video signal.

In the following description, the audio/video general purpose apparatus is described taking as an example a case wherein an audio signal such as, for example, music data as contents information is recorded onto or reproduced from a recording medium similarly as in the case of the audio/video-only apparatus described above.

Figure 13:
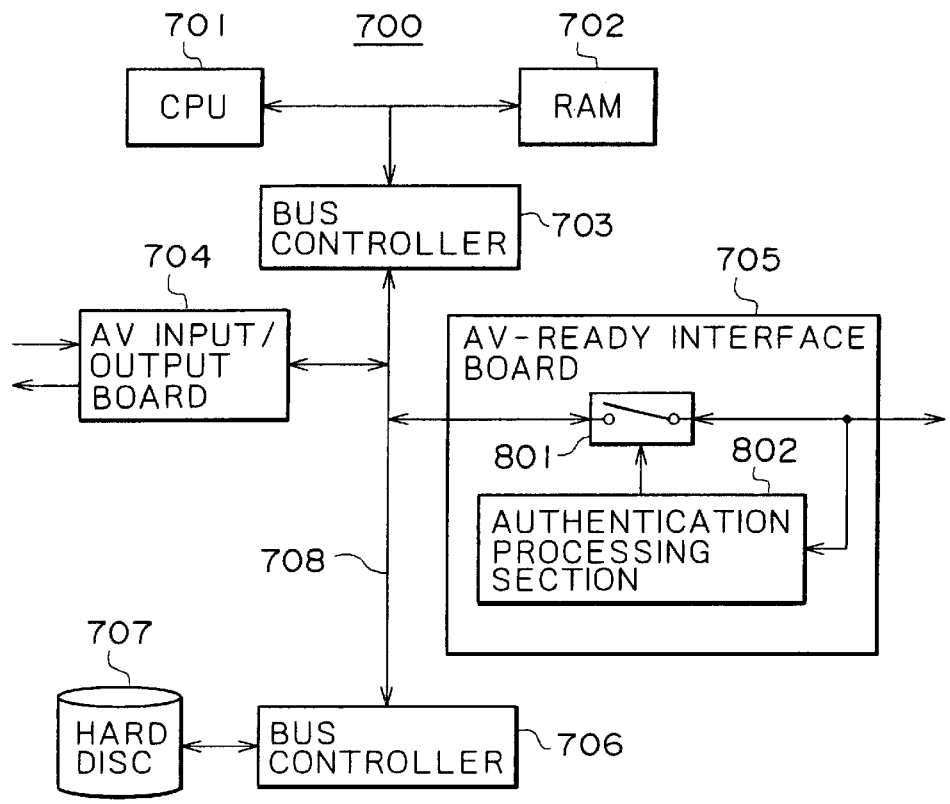
FIG. 13 is a block diagram of another audio/video apparatus serving as a recording apparatus and a reproduction apparatus of the second embodiment.

FIG. 13 is a block diagram showing an audio/video general purpose apparatus (AV-ready computer: AV is an abbreviation of audio (A) visual (V)) of the present embodiment. Referring to FIG. 13, the audio/video general purpose apparatus of the present embodiment is generally denoted at 700 and includes a CPU (Central Processing Unit) 701, a RAM (Read Only Memory) 702, a bus controller 703, an AV input/output board 704, an AV-ready interface board (audio/video interface) 705, another bus controller 706 and a hard disc apparatus section 707 connected to each other by an internal bus 708.

The CPU 701 controls the components of the audio/video general purpose apparatus 700. The RAM 702 is a non-volatile memory and is used as a working area upon various processing executed by the CPU 701 and as a copying history information management memory which stores copying history information when copying control is performed in accordance with the UCS method. In short, the storage area of the RAM 702 is divided into a plurality of divisional areas including, for example, an area which is used as a working area and another area for storing copying history information when copying control is performed in accordance with the UCS method.

The bus controller 703 controls inputting/outputting of data between the CPU 701 or RAM 702 and the internal bus 708. The AV input/output board 704 allows inputting/outputting to and from various reproduction apparatus or recording and reproduction apparatus for a recording medium on which an audio signal and/or a video signal are recorded such as, for example, a CD-ROM driver. The bus controller 706 in the present embodiment controls inputting/outputting of data between the hard disc apparatus section 707 and the internal bus 708.

The AV-ready interface board 705 is provided to record an audio signal as contents information read out from a CD-ROM, for example, by a CD-ROM driver connected thereto through the AV input/output board 704 mentioned hereinabove onto a recording medium or read out an audio signal such as, for example, music data from a recording medium and reproduce the audio signal.

The AV-ready interface board 705 includes a switch circuit 801 and an authentication processing section 802 as shown in FIG. 13. The authentication processing section 802 communicates with a recording medium connected to the AV-ready interface board 705 to establish authentication with the recording medium.

In this instance, when the recording medium connected to the AV-ready interface board 705 is the audio/video recording medium 600A with the authentication processing section 603 described hereinabove with reference to FIG. 10, authentication is established between the authentication processing section 802 of the AV-ready interface board 705 and the authentication processing section 603 of the audio/video recording medium 600A.

The authentication processing section 802 of the AV-ready interface board 705 controls the switch circuit 801 to an on-state if the recording medium connected to the AV-ready interface board 705 is the audio/video recording medium 600A and consequently authentication has been established successfully. Meanwhile, in the audio/video recording medium 600A, the authentication processing section 603 switches the switch circuit 602 on because authentication can be established with the other party apparatus where the other party apparatus is the audio/video general purpose apparatus including an authentication processing section or the audio/video-only apparatus described above.

Consequently, the audio/video general purpose apparatus 700 is controlled to access the data storage area 601 of the audio/video recording medium 600A through the AV-ready interface board 705.

On the other hand, when an output signal read out by a reproduction apparatus or a recording and reproduction apparatus for a recording medium such as, for example, a CD-ROM driver connected to the audio/video general purpose apparatus 700 of the present embodiment is to be recorded onto the audio/video recording medium 600A connected to the AV-ready interface board 705 through the AV input/output board 704, the audio/video general purpose apparatus of the present embodiment performs copying control in accordance with the UCS method.

The audio/video general purpose apparatus of the present embodiment is constructed such that it can select normal rate copying or high rate copying, for example, by a switching operation by the user similarly to the audio/video-only apparatus described hereinabove. However, in the audio/video general purpose apparatus, when copying onto an audio/video recording medium is to be performed, even if one of normal rate copying and high rate copying has been selected, copying control of the UCS method is performed.

A general purpose apparatus such as the audio/video general purpose apparatus 700 is constructed from its characteristic such that it can copy the same audio signal such as, for example, music data onto a large number of recording media in a short time, distribute an audio signal as contents information over a network such as the Internet or receive an audio signal distributed thereto and record it onto a recording medium.

However, since copying of an audio signal onto a recording medium through the AV-ready interface board 705 is permitted only once by copying control of the UCS method described above, illegal copying which damages the benefits to the proprietor of the copyright of the audio signal can be prevented.

On the other hand, where the recording medium connected to the AV-ready interface board 705 is the general purpose recording medium 600B which does not include the authentication processing section 603, authentication cannot be established between the audio/video general purpose apparatus 700 and the general purpose recording medium 600B.

In this instance, since the switch circuit 801 is not switched on by the authentication processing section 802 of the AV-ready interface board 705, the audio/video general purpose apparatus 700 is controlled not to copy the audio signal as contents information onto the general purpose recording medium 600B.

In this manner, since the audio/video general purpose apparatus 700 is controlled so that an audio signal cannot be copied onto the general purpose recording medium 600B, the disadvantage that an audio signal copied on the general purpose recording medium 600B is processed as general purpose data and is successively copied freely without being subject to copying control can be prevented.

Further, the audio/video general purpose apparatus of the present embodiment is controlled so that, similarly to the audio/video-only apparatus described hereinabove, it cannot reproduce an information signal recorded on the general purpose recording medium 600B. This is because the switch circuit 801 is not switched on since the authentication processing section 802 fails to establish authentication. Consequently, for example, even if contents information is illegally copied onto a general purpose recording medium by a general purpose apparatus which is hereinafter described, since the contents information cannot be reproduced by the audio/video general purpose apparatus, also illegal copying of contents information onto a general purpose recording medium can be prevented.

"Processing of the Audio/Video General Purpose Apparatus upon Recording"

Figure 14:
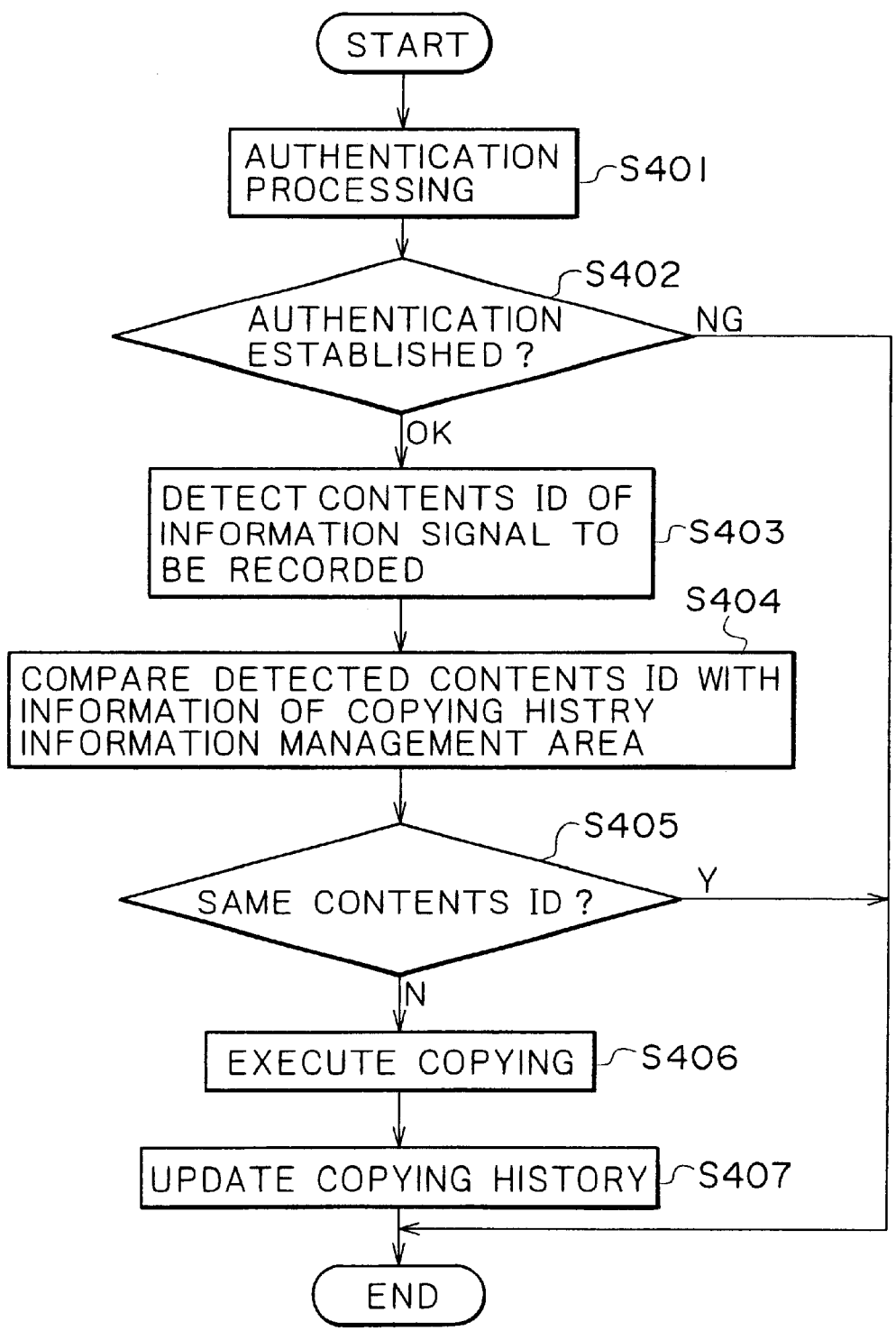
FIG. 14 is a flow chart illustrating a processing procedure executed by the audio/video apparatus shown in FIG. 13 when it records an information signal.

Now, processing upon recording of the audio/video general purpose apparatus of the present embodiment described above with reference to FIG. 13 is described with reference to a flow chart of FIG. 14. FIG. 14 illustrates a processing procedure when an audio signal as contents information is recorded onto a recording medium by the audio/video general purpose apparatus of the present embodiment.

If a recording medium is connected to the AV-ready interface board 705 of the audio/video general purpose apparatus of the present embodiment, then the authentication processing section 802 of the AV-ready interface board 705 establishes authentication with the recording medium (step S401).

Then, the CPU 701 discriminates whether or not the AV-ready interface board 705 has successfully established authentication (step S402). If the CPU 701 discriminates that authentication has not been established successfully, then the processing procedure illustrated in FIG. 14 is ended. In particular, if the recording medium loaded is a general purpose recording medium which does not include the authentication processing section 603, then since authentication cannot be established, the CPU 701 controls the audio/video general purpose apparatus so that copying of an audio signal onto the general purpose recording medium loaded and reproduction of data recorded on the general purpose recording medium loaded cannot be performed by the audio/video general purpose apparatus.

If the CPU 701 discriminates in the discrimination processing in step S402 that authentication has been established successfully, then the switch circuit 801 is switched on by the authentication processing section 802. Consequently, the CPU 701 controls the pertaining components so that an audio signal supplied thereto through the AV input/output board may be recorded onto the recording medium connected to the AV-ready interface board 705. Thereupon, the audio/video general purpose apparatus 700 of the present embodiment performs copying control of the UCS method described hereinabove with reference to FIG. 8.

In particular, the CPU 701 detects a contents ID from the audio signal inputted thereto through the AV input/output board 704 (step S403). Then, the CPU 701 compares the contents ID thus detected with contents IDs stored in a copying history information management area of the RAM 702 to search for the contents ID same as the contents ID of the audio signal instructed to be copied by the user (step S404).

Then, the CPU 701 discriminates whether or not the contents ID same as the contents ID of the audio signal instructed to be copied by the user is present in the copying history information management area of the RAM 702 (step S405). If the CPU 701 discriminates in the discrimination processing in step S405 that the same contents ID is present, then since this signifies that the audio signal of the contents ID has been copied already by the audio/video general purpose apparatus 700, the CPU 701 controls the AV-ready interface board 705 to inhibit copying of the target audio signal, thereby ending the processing procedure illustrated in FIG. 14.

On the contrary if the CPU 701 discriminates in the discrimination processing in step S405 that the same contents ID is not present in the copying history information management area of the RAM 702, then the CPU 701 controls the AV-ready interface board 705 to execute copying of the target audio signal onto the audio/video recording medium (step S406), and records the contents ID of the copied audio signal as copying history management information into the copying history information management area of the RAM 702 to update the information of the copying history information management area (step S407).

In this manner, the audio/video general purpose apparatus of the present embodiment discriminates a recording medium onto which an audio signal as contents information is to be copied in accordance with an instruction from a user by deciding what information signal is to be recorded thereon, and is controlled such that it can copy the audio signal where the recording medium is an audio/video recording medium onto which an audio signal as contents information can be recorded, but cannot copy the audio signal where the recording medium is a general purpose recording medium.

Further, when an audio signal is copied onto an audio/video recording medium, the audio/video general purpose apparatus performs copying control of the UCS method which uses more severe copying control than the SCMS method irrespective of normal rate copying or high rate copying.

Consequently, the audio/video general purpose apparatus of the present embodiment is controlled such that copying of contents information onto a general purpose recording medium which has a high degree of possibility that a copied information signal may be copied without being subject to copying control is prevented. Further, since the audio/video general purpose apparatus performs copying control of the UCS method upon copying of an audio signal, such illegal copying of an audio signal as may damage to the benefits to the proprietor of the copyright of the audio signal can be prevented.

Further, although the audio/video general purpose apparatus of the present embodiment performs copying control of the UCS method when it copies an audio signal onto an audio/video recording medium, since it can be copied onto an audio/video recording medium at least once, the convenience to the user of the audio signal is not narrowed very much.

"General Purpose Apparatus"

Figure 15:
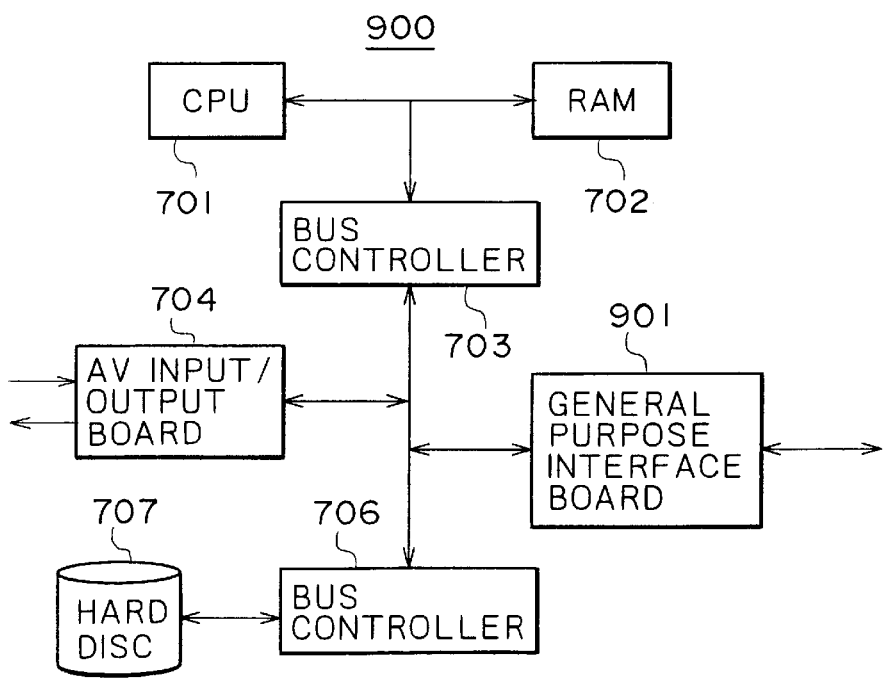
FIG. 15 is a block diagram showing a general purpose apparatus serving as a recording apparatus and a reproduction apparatus of the second embodiment.

Now, a general purpose apparatus of the present embodiment mentioned hereinabove is described. FIG. 15 is a block diagram showing the general purpose apparatus of the present embodiment. The general purpose apparatus of the present embodiment is a computer which can perform various processes for an information signal such as computer data and can perform various information processing such as production, correction, erasure and storage of an information signal, and is constructed in a similar manner to that of general purpose apparatus which are conventionally used.

Referring to FIG. 15, the general purpose apparatus of the present embodiment is generally denoted at 900 and includes a CPU 701, a RAM 702, a bus controller 703, an AV input/output board 704, a bus controller 706, and a hard disc apparatus section 707 which are similar to those of the audio/video general purpose apparatus 700 described hereinabove with reference to FIG. 13 overlapping description of the components just mentioned is omitted here to avoid redundancy. The general purpose apparatus 900 further includes a general purpose interface board 901. Thus, the general purpose apparatus of the present embodiment is constructed substantially similar to the audio/video general purpose apparatus 700 described hereinabove with reference to FIG. 13 except that it includes the general purpose interface board 901 in place of the AV-ready interface board 705.

The general purpose interface board 901 of the general purpose apparatus 900 of the present embodiment shown in FIG. 15 is an interface with a recording medium similar to the AV-ready interface board 705 of the audio/video general purpose apparatus described hereinabove with reference to FIG. 13. However, the general purpose apparatus 900 does not include an authentication processing section or a switch circuit for establishing authentication with a recording medium.

Consequently, if the audio/video recording medium 600A described hereinabove with reference to FIG. 10 is connected to the general purpose interface board 901 of the general purpose apparatus 900 of the present embodiment, then the authentication processing section 603 of the audio/video recording medium 600A cannot establish authentication with the general purpose apparatus 900, and consequently, the switch circuit 602 of the audio/video recording medium 600A is not switched on.

Therefore, the general purpose apparatus 900 of the present embodiment is controlled so that it cannot copy various information signals such as an audio signal, a video signal and computer data onto the audio/video recording medium 600A. Consequently, illegal copying of contents information such as an audio signal onto an audio/video recording medium using the general purpose apparatus is prevented.

On the other hand, if the general purpose recording medium 600B described hereinabove with reference to FIG. 11 is connected to the general purpose interface board 901 of the general purpose apparatus 900, then the general purpose apparatus 900 is controlled so that it can record various information signals such as an audio signal, a video signal and computer data onto the general purpose recording medium 900B.

However, as described hereinabove, an audio/video-only apparatus or an audio/video general purpose apparatus cannot read out or reproduce an information signal recorded on the general purpose recording medium 600B because authentication cannot be established. Therefore, even if contents information such as an audio signal is copied onto a general purpose recording medium by a general purpose apparatus, it cannot be reproduced using an audio/video-only apparatus or an audio/video general purpose apparatus, and consequently, illegal copying of contents information using a general purpose apparatus can be prevented.

It is to be noted that, while, in the embodiment described above, a case wherein an audio signal as contents information is recorded onto a recording medium is described as an example, the information signal to be copied is not limited to an audio signal. For example, the present invention can be applied also where a video signal or an audio signal and a video signal are recorded onto a recording medium.

For example, where a video signal is recorded onto a recording medium, copying control of the CGMS method should be used in place of copying control of the SCMS method.

Further, in the embodiment described above, each of the audio/video recording medium, audio/video-only apparatus and audio/video general purpose apparatus includes an authentication processing section, and the audio/video recording medium and each of the audio/video-only apparatus and audio/video general purpose apparatus communicate with each other through the authentication processing sections thereof to establish authentication therebetween so that the recording apparatus side discriminates whether the other party recording medium is an audio/video recording medium or a general purpose recording medium while the recording medium side discriminates whether the other party recording apparatus is an audio/video-only apparatus or an audio/video general purpose apparatus.

However, the method of discrimination of a recording medium is not limited to such establishment of authentication through the authentication processing sections, and, for example, it is possible to record recording medium information representative of an audio/video recording medium or a general purpose recording medium into an area of the recording medium which cannot be accessed for reading our or writing in by a user, read out the medium information by means of an audio/video-only apparatus or an audio/video general apparatus and discriminate the recording medium by deciding what information signal is to be recorded thereon based on the medium information.

Further, while, in the embodiment described above, a copying controlling method is selected depending upon what information signal an apparatus is designed to record, for what information signal is recorded onto a recording medium onto which an information signal is to be recorded by the apparatus, and which one of normal rate copying and high rate copying is used as described hereinabove with reference to FIG. 8. However, the selection is not limited to this.

For example, a copying controlling method may be selected based on a result of discrimination of for what information signal a recording medium onto which an information signal is to be recorded is. In particular, it is discriminated for what information signal a recording medium is, and, a copying controlling method is selected such that, when an information signal of the type which should originally be recorded onto the recording medium is tried to be recorded onto the recording medium, copying control is performed in accordance with a copying controlling method determined in advance, but when an information signal of the type different from that which should originally be recorded onto the recording medium is tried to be recorded onto the recording medium, the recording is inhibited.

Consequently, such a disadvantage which arises from recording of an information signal different from an information signal which should originally be recorded onto a recording medium that, for example, the recorded information is not treated as the original information signal but treated as, for example, general purpose data and is copied freely can be avoided.

Further, when the recording medium onto which an information signal is to be recorded in accordance with an instruction from the user is an audio/video recording medium, normal rate copying may be used without fail to copy an audio signal or a video signal onto the audio/video recording medium.

Consequently, when an audio signal or a video signal as contents information is to be copied onto an audio/video recording medium, since high rate copying is disabled, it is impossible to produce a large number of audio/video recording media on which the same contents information is copied in a short time. Consequently, illegal copying of contents information can be prevented and the benefits and the right of the proprietor of the copyright of the contents information can be protected.

Alternatively, a copying controlling method may be selected depending upon a result of discrimination of for what information signal a recording medium is and whether the selected recording rate is the normal rate or the high rate. For example, if the recording medium onto which an information signal is to be copied is an audio/video recording medium and normal rate copying is selected, then copy generation limitation control of the SCMS method or the CGMS method is performed. If the recording medium is an audio/video recording medium and high rate recording is selected, then copying control of the UCS method is performed.

Consequently, where recording media on which the same information signal is copied can be produced in a short time, copying control of the UCS method is performed, and illegal copying can be prevented.

In order to prevent illegal copying of contents information such as an audio signal or a video signal, a copying controlling method may be selected depending upon the discrimination of the recording apparatus which records an information signal onto a recording medium by deciding what information signal is to be recorded, or a copying controlling method may be selected depending upon the discrimination of the recording apparatus which records an information signal onto a recording medium by deciding what information signal is to be recorded and which one of normal rate copying and high rate copying should be used.

Alternatively, a copying controlling method to be used may be selected depending upon whether normal rate coping is used or high rate copying is used when an information signal is recorded onto a recording medium. In this instance, when an information signal is recorded onto a recording medium by high rate copying, if a copying controlling method which uses more severe copying limitation than that when normal rate copying is performed such as to perform copying control of the UCS method is used, then illegal copying of an information signal can be prevented effectively.

In this manner, when normal rate copying is performed by an audio/video-only apparatus, copying control of a copy generation limitation method of the SCMS method or the CGMS method can be used. On the other hand, upon high rate copying which may be used for illegal copying such as production of a large number of copies with a high degree of possibility, illegal copying can be prevented effectively by performing copying control, for example, of the UCS method which uses more severe copying limitation than the SCMS method or the CGMS method.

Meanwhile, a general purpose apparatus such as a computer can, from its characteristic, copy an information signal onto a recording medium comparatively readily and rapidly, distribute an audio signal over a network or receive an audio signal distributed thereto and record it onto a recording medium. Therefore, where a general purpose apparatus is involved, by performing copying control, for example, of the UCS method irrespective of whether normal rate copying is performed or high rate copying is performed, illegal copying of contents information can be prevented effectively.

Further, since a copying controlling method can be selected depending upon a recording medium, a recording apparatus and a recording rate, where an audio/video-only apparatus or an audio/video general purpose apparatus is used, recording of contents information of a general purpose recording medium which may be copied illegally with a high degree of possibility can be inhibited. Also recording of an information signal onto an audio/video recording medium by a general purpose apparatus can be inhibited.

Further, contents information such as an audio signal or a video signal recorded on a general purpose recording medium which does not guarantee copying control is controlled so that it cannot be reproduced by an audio/video-only apparatus or an audio/video general purpose apparatus.

Accordingly, even if a general purpose apparatus is used to copy contents information such as an audio signal or a video signal onto a general purpose recording medium, since the contents information cannot be reproduced or utilized by an audio/video-only apparatus or an audio/video general purpose apparatus, illegal copying of the contents information can be prevented.

Further, while copy generation controlling methods of the SCMS method and the CGMS method are used as copying controlling methods other than the UCS method, the copying controlling methods are not limited to them. For example, naturally it is possible to use an electronic watermark technique to form electronic watermark information indicative of "permission of copying (Copy Free)", "permission of copying once (permission of copying for only one generation) (Copy Once)", "inhibition of copying any more (No More Copy)" or "absolute inhibition of copying (Never Copy)" and superpose and transmit the electronic watermark information on and together with contents information such as an audio signal or a video signal.

In this instance, the recording apparatus side may extract the electronic watermark information superposed on the contents information such as an audio signal or a video signal and use the extracted electronic watermark information to perform copy generation limitation control.

Naturally, not only the copying controlling methods of the SCMS method, the CGMS method, the electronic watermark processing method and the UCS method, but also any other copying controlling method may be used.

Further, while, in the embodiment described above, a case wherein an audio signal reproduced by a reproduction apparatus for an audio signal such as a reproduction apparatus for a CD is copied onto a recording medium is described as an example, the information signal to be copied is not limited to a signal from a reproduction apparatus.

The present invention can be applied also where, for example, contents information such as an audio signal or a video signal transmitted through a broadcasting medium or contents information transmitted through a network such as the Internet is to be recorded onto a recording medium. In such an instance, information for copy generation limitation control or identification information such as a contents ID should be added to and transmitted together with contents information to be transmitted.

It is to be noted that, while, in the present specification, it is described that copying control is performed not by the reproduction apparatus side but by the recording side, the copying control also includes copying control by the reproduction apparatus side wherein transmission of contents information to the recording apparatus side is controlled depending upon a recording medium, a recording apparatus and/or a recording rate. Further, copying control includes also movement (Move) of data.

While preferred embodiments of the present invention have been described using specific terms, such description is for illustrative purposes only, and it is to be understood that changes and variations may be made without departing from the spirit or scope of the following claims.

What is claimed is:

1. An outputting apparatus for adding additional information to data and outputting resulting data, comprising:

identification data generation means for generating identification data to be recorded to a recording apparatus along with the data for identification of the data;

copying count data generation means for generating copying count data to be recorded to said recording apparatus along with said data for being compared with copying history data to also be recorded to said recording apparatus along with said data of the data to be stored in said recording apparatus, which is capable of recording the data onto a medium, to limit the number of times the data may be copied onto other media;

control data processing means for processing the identification data and the copying count data to form electronic information representative thereof which, when combined with the data, is not significant to the perception of the data, addition means for adding the identification data and the copying count data to the data; and outputting means for outputting the data having the identification data and the copying count data added thereto.

2. An outputting apparatus according to claim 1, further comprising recording means for recording the data outputted from said outputting means and having the identification data and the copying count data added thereto onto a recording medium.

3. An outputting apparatus according to claim 1, wherein said addition means superposes the identification.

4. A recording apparatus for recording data onto a recording medium, said data including electronic information representative of processed identification data and copying count data, said electronic information not being significant to the perception of the data, comprising:

identification data detection means for detecting identification data recorded along with the data for identification of the data;

copying count data detection means for detecting copying count data recorded along with the data for limiting the number of times of copying the data; and recording control means for controlling recording of the data onto the recording medium based on the identification data detected by said identification data detection means and the copying count data detected by said copying count data detection means.

5. A recording apparatus according to claim 4, wherein said recording control means includes storage means for storing the identification data and the copying count data in a corresponding relationship to each other therein, and said recording control means controls recording of the data onto the recording medium in response to the identification data and the copying count data stored in said storage means.

6. A recording apparatus according to claim 5, further comprising addition means for adding apparatus identification data of said recording apparatus to the data.

7. A recording apparatus according to claim 6, further comprising apparatus identification data detection means for detecting the apparatus identification data added to the data recorded on the recording medium, and data erasure means for erasing the data recorded on the recording medium, and wherein, when the data recorded on the recording medium is erased by said data erasure means and the apparatus identification data detected by said apparatus identification data detection means and the apparatus identification data of said recording apparatus coincide with each other, said recording control means increments the permitted number of times of copying the data as the copying count data corresponding to the erased data stored in said storage means.

8. A recording apparatus according to claim 4, further comprising next generation copying limitation data detection means for detecting next generation copying limitation data for limiting copying of a next generation data from the data, and wherein said recording control means controls recording of the next generation data onto the recording medium based on the next generation copying limitation data detected by said next generation copying limitation data detection means.

9. An outputting method for adding additional information to data and outputting resulting data, comprising:

an identification data generation step of generating identification data to be recorded to a recording apparatus along with the data for identification of the data;

a copying count data generation step of generating copying count data to be recorded to said recording apparatus along with said data for being compared with copying history data to also be recorded to said recording apparatus along with said data of the data to be stored in said recording apparatus, which is capable of recording the data onto a medium, to limit the number of times of copying the data onto other media;

a control data processing step for processing the identification data and the copying count data to form electronic information representative thereof which, when combined with the data, is not significant to the perception of the data;

an addition step of adding the identification data and the copying count data to the data; and an outputting step of outputting the data having the identification data and the copying count data added thereto.

10. A recording method for recording data onto a recording medium, said data including electronic information representative of processed identification data and copying count data, said electronic information not being significant to the perception of the data, comprising:

an identification data detection step of detecting identification data recorded along with the data for identification of the data;

a copying count data detection step of detecting copying count data recorded along with the data for limiting the number of times of copying the data; and a recording control step of controlling recording of the data onto the recording medium based on the identification data detected by the identification data detection step and the copying count data detected by the copying count data detection step.

11. A recording medium on which audio visual data is recorded, the audio visual data comprising:

the data;

identification data stored along with the data for identification of the data; and copying count data stored along with said data for being compared with copying history data also stored along with said data of the data stored in said recording apparatus, which is capable of recording the data onto said recording medium, to limit the number of times of copying the data onto other media;

wherein said identification data and said copying count data are processed to form electronic information representative thereof, which, when combined with the data, is not significant to the perception thereof.

12. A recording medium on which audio visual data is recorded, the audio visual data comprising:

the data;

identification data stored along with the data for identification of the data;

copying count data stored along with said data for being compared with copying history data also stored along with said data of the data stored in said recording apparatus, which is capable of recording the data onto said recording medium, to limit the number of times of copying the data onto other media; and apparatus identification data of a recording apparatus which has recorded the data from another medium;

wherein said identification data and said copying count data are processed to form electronic information representative thereof, which, when combined with the data, is not significant to the perception thereof.

13. The outputting apparatus of claim 1, wherein said information is formed as electronic watermark information.

14. The outputting apparatus of claim 1, wherein said electronic information cannot be separated from the data.

15. The outputting apparatus of claim 1, wherein said electronic information cannot be rewritten or overwritten without proper authentication.

16. The outputting apparatus of claim 1, wherein the control data processing means performs a spectrum spreading process to form the electronic information.

17. The outputting apparatus of claim 1, wherein the electronic information is superimposed on the data by the addition means.

18. The outputting apparatus of claim 1, further comprising data comprising means for compressing the data, wherein the electronic information is added to the compressed data by the addition means.

19. The outputting method of claim 9, wherein said information is formed as electronic watermark information.

20. The outputting method of claim 9, wherein said electronic information cannot be separated from the data.

21. The outputting method of claim 9, wherein said electronic information cannot be rewritten or overwritten without proper authentication.

22. The outputting method of claim 9, wherein a spectrum spreading process is performed to form the electronic information.

23. The outputting method of claim 9, wherein the electronic information is superimposed on the data.

24. The outputting method of claim 9, further comprising the steps of:

compressing the data; and adding the electronic information to the compressed data.

* * * * *